United States Patent [19]
Tan et al.

[11] Patent Number: 5,920,710
[45] Date of Patent: Jul. 6, 1999

[54] APPARATUS AND METHOD FOR MODIFYING STATUS BITS IN A REORDER BUFFER WITH A LARGE SPECULATIVE STATE

[75] Inventors: Teik-Chung Tan; Thang M. Tran, both of Austin, Tex.

[73] Assignee: Advanced Micro Devices, Inc., Sunnyvale, Calif.

[21] Appl. No.: 08/751,649

[22] Filed: Nov. 18, 1996

[51] Int. Cl.[6] ........................................ G06F 9/38
[52] U.S. Cl. .................... 395/392; 395/390; 395/391; 395/393; 395/800.23
[58] Field of Search .................... 395/392, 394, 395/391, 390, 393, 582, 585, 800.23

[56] References Cited

U.S. PATENT DOCUMENTS

| | | |
|---|---|---|
| 4,044,338 | 8/1977 | Wolf . |
| 4,453,212 | 6/1984 | Gaither et al. . |
| 4,807,115 | 2/1989 | Torng . |
| 4,858,105 | 8/1989 | Kuriyama et al. . |
| 4,928,223 | 5/1990 | Dao et al. . |
| 5,053,631 | 10/1991 | Perlman et al. . |
| 5,058,048 | 10/1991 | Gupta et al. . |
| 5,129,067 | 7/1992 | Johnson . |
| 5,136,697 | 8/1992 | Johnson . |
| 5,150,470 | 9/1992 | Hicks et al. ............... 395/393 |
| 5,226,126 | 7/1993 | McFarland et al. . |
| 5,226,130 | 7/1993 | Favor et al. . |
| 5,442,756 | 8/1995 | Grochowski et al. ............ 395/585 |
| 5,452,426 | 9/1995 | Papworth et al. ............... 395/393 |
| 5,548,776 | 8/1996 | Colwell et al. ............... 395/393 |
| 5,553,256 | 9/1996 | Fetterman et al. ............. 395/393 |
| 5,586,278 | 12/1996 | Papworth et al. ............. 395/582 |
| 5,613,132 | 3/1997 | Clift et al. ................ 395/393 |
| 5,625,837 | 4/1997 | Popescu et al. ............. 395/800.23 |
| 5,627,985 | 5/1997 | Fetterman et al. ............ 395/393 |
| 5,644,779 | 7/1997 | Song ...................... 395/800 |
| 5,649,225 | 7/1997 | White et al. ............... 395/800 |
| 5,655,096 | 8/1997 | Branigin .................. 395/376 |
| 5,664,138 | 9/1997 | Yoshida ................... 395/395 |
| 5,708,841 | 1/1998 | Popescu et al. ............ 395/800.23 |

FOREIGN PATENT DOCUMENTS

| | | |
|---|---|---|
| 0259095 | 3/1988 | European Pat. Off. . |
| 0381471 | 8/1990 | European Pat. Off. . |
| 0459232 | 12/1991 | European Pat. Off. . |
| 2263985 | 8/1993 | United Kingdom . |
| 2263987 | 8/1993 | United Kingdom . |
| 2281422 | 3/1995 | United Kingdom . |

OTHER PUBLICATIONS

Intel, "Chapter 2: Microprocessor Architecture Overview," pp. 2–1 through 2–4.

Michael Slater, "AMD's K.5 Designed to Outrun Pentium," Microprocessor Report, vol. 8, No. 14, Oct. 24, 1994, 7 pages.

Sebastian Rupley and John Clyman, "P6: The Next Step?," PC Magazine, Sep. 12, 1995, 16 pages.

Tom R. Halfhill, "AMD K6 Takes On Intel P6," BYTE, Jan. 1996, 4 pages.

*Primary Examiner*—Zarni Maung
*Assistant Examiner*—Saleh Najjar
*Attorney, Agent, or Firm*—Conley, Rose & Tayon; Lawrence J. Merkel; B. Noel Kivlin

[57] ABSTRACT

A superscalar microprocessor implements a reorder buffer to support out-of-order execution of instructions. To reduce the time delay for identifying mispredicted instructions, prioritizing mispredicted instructions, canceling instructions subsequent to the mispredicted instruction and reading status information from the reorder buffer, the availability of an instruction tag, which identifies the instruction being executed, during the execution of the instruction is utilized. The reorder buffer receives the tag of the instruction issued to the functional unit. In parallel with the execution of the instruction, the reorder buffer generates hit masks identifying instructions to be canceled in the event of a mispredicted branch. In parallel, status information from the instruction (or instructions) being executed is selected from the reorder buffer and prioritization masks are generated. Therefore, if a mispredicted branch is detected, the instructions that need to be canceled can be readily identified and the instruction status information is readily available.

20 Claims, 12 Drawing Sheets

130

Result[31:0]
Result Valid
Flag[6:0]
Branch
LS_Sync
SBZ
Exception[1:0]
Breakpoint[1:0]
LIB[3:0]
FLIB[3:0]
LIL[2:0]
FLIL[3:0]
Cancel
Destination[5:0]
Destination Valid
WRFL[3:0]
Size[2:0]
End_Byte[3:0]
CRET
PC_SEL
Sel_eflg
INT_ENB
Store
WSR
Null
Exit
Entry Valid

Branch Misprediction
CSSEL[15:0]
Floating Point
FPOPC[10:0]
FSYNC
Last1
Last2
Linetag1[4:0]
Linetag2[4:0]
LineOffset1[3:0]
LineOffset2[3:0]
MROM
NoMisp
PC1[31:0]
PC2[31:0]
PCSHFT
VLTAG[3:0]
VLTAGP1[3:0]

APPARATUS AND METHOD FOR MODIFYING STATUS BITS IN A REORDER BUFFER WITH A LARGE SPECULATIVE STATE

BACKGROUND OF THE INVENTION

1. Field of the Invention

This invention is related to the field of superscalar microprocessors and, more particularly, to canceling speculatively executed instructions within reorder buffers of superscalar microprocessors.

2. Description of the Relevant Art

Superscalar microprocessors achieve high performance by executing multiple instructions per clock cycle and by choosing the shortest possible clock cycle consistent with the design. As used herein, the term "clock cycle" refers to an interval of time accorded to various stages of an instruction processing pipeline within the microprocessor. Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively. The term "instruction processing pipeline" is used herein to refer to the logic circuits employed to process instructions in a pipelined fashion. Although the pipeline may be divided into any number of stages at which portions of instruction processing are performed, instruction processing generally comprises fetching the instruction, decoding the instruction, executing the instruction, and storing the execution results in the destination identified by the instruction.

In order to increase performance, superscalar microprocessors often employ out of order execution. The instructions within a program are ordered, such that a first instruction is intended to be executed before a second instruction, etc. When the instructions are executed in the order specified, the intended functionality of the program is realized. However, instructions may be executed in any order as long as the original functionality is maintained. For example, a second instruction which does not depend upon a first instruction may be executed prior to the first instruction, even if the first instruction is prior to the second instruction in program order. A second instruction depends upon a first instruction if a result produced by the first instruction is employed as an operand of the second instruction. The second instruction is said to have a dependency upon the first instruction. As used herein, the term "program execution sequence" refers to the sequence of instructions which were intended to be executed. An instruction is earlier in the program execution sequence than another instruction if it was intended to be executed before that instruction. An instruction is later in the program execution sequence if it was intended to be executed after the other instruction.

Another hazard of out of order execution occurs when two instructions update the same destination storage location. If the instruction which is second in the original program sequence executes first, then that instruction must not update the destination until the first instruction has executed. Often, superscalar microprocessors employ a reorder buffer in order to correctly handle dependency checking and multiple updates to a destination, among other things. Instructions are stored into the reorder buffer in program order, typically as the instructions are dispatched to execution units (perhaps being stored in reservation stations associated therewith). The results of the instructions are stored into the destinations from the reorder buffer in program order. However, results may be provided to the reorder buffer in any order. The reorder buffer stores each result with the instruction which generated the result until that instruction is selected for storing its result into the destination.

A reorder buffer is configured to store a finite number of instructions, defining a maximum number of instructions which may be concurrently outstanding within the superscalar microprocessor. Generally speaking, out of order execution occurs more frequently as the finite number is increased. For example, the execution of an instruction which is foremost within the reorder buffer in program order may be delayed. Instructions subsequently dispatched into the reorder buffer which are not dependent upon the delayed instruction may execute and store results in the buffer. Out of order execution may continue until the reorder buffer becomes full, at which point dispatch is suspended until instructions are deleted from the reorder buffer. Therefore, a larger number of storage locations within the reorder buffer generally leads to increased performance by allowing more instructions to be outstanding before instruction dispatch (and out of order execution) stalls. Increasing the size of the reorder buffer is called increasing the speculative states of the reorder buffer.

Unfortunately, larger reorder buffers complicate recovery from exceptions, such as branch mispredictions. For the purposes of this disclosure, a mispredicted branch instruction will be used to illustrate an exception. It is understood that other types of exceptions can be handled in a similar manner. In the cases of exceptions or mispredicted branches, the reorder buffer may restore the architecture state of the microprocessor and cancel speculatively executed instructions later in the program execution sequence than the instruction that caused the exception. Each instruction in the reorder buffer has a cancel status bit attached to the instruction that indicates if the instruction has been canceled. When a mispredicted branch is detected, the mispredicted branch instruction is located in the reorder buffer, and the mispredicted branch instruction and any speculative instructions that occur after the mispredicted branch instruction in the program execution sequence are canceled by setting the cancel status bits for those instructions. In a reorder buffer with a large speculative state, the circuitry necessary to set the cancel status bits in the reorder buffer based on a mispredicted instruction is relatively slow. The circuitry is relatively slow because a large number of instructions within the reorder buffer must be evaluated to determine which instructions must be canceled due to the mispredicted branch. For example, in a forty-five entry reorder buffer, the last entry in the reorder buffer will be canceled if any of the forty-four entries before it is a mispredicted branch instruction. The circuitry to detect this condition requires a forty-four input OR function, which relatively slow.

Restoring the state of the microprocessor requires the status bits of the mispredicted instruction to be read from the reorder buffer. The status bits indicate, among other things, whether an instruction is part of a microcode sequence and the type of branch instruction. The actions taken by the reorder buffer to recover from a mispredicted branch instruction depend upon the status information contained in these status bits. To read the status bits from the reorder buffer, the mispredicted branch instruction must be identified and then the status bits downloaded from the reorder buffer instruction storage position allocated to that instruction. The circuitry necessary to multiplex the status bits from a reorder buffer instruction storage position is relatively slow. For example, in a forty-five entry instruction reorder buffer, a 45-to-1 multiplexer is required.

In microprocessors that return multiple results in one clock cycle, multiple exceptions may occur in one clock cycle. It is necessary to prioritize the multiple exceptions to determine which occurred earliest in the program sequence. This prioritization occurs after any exceptions have been detected. In high frequency microprocessors, the time required to detect and prioritize exceptions may exceed the period of a clock cycle.

It is desirable to reduce the delay for: identifying a mispredicted branch instruction, canceling instructions subsequent to the mispredicted branch instruction, obtaining the status bits from the mispredicted branch instruction, and prioritizing multiple mispredicted branch instructions.

SUMMARY OF THE INVENTION

The problems outlined above are in large part solved by a reorder buffer in accordance with the present invention. The reorder buffer receives an instruction tag as the instruction is dispatched to a functional unit. In parallel with the execution of the instruction, the reorder buffer identifies the instruction in the reorder buffer by comparing the instruction tag to the instructions stored in the reorder buffer. Additionally, the reorder buffer generates a hit mask that identifies instructions in the reorder buffer that need to be canceled if an exception occurs. For example, the hit mask may identify instructions that occur later in the program execution sequence than the executing instruction. For the purpose of this disclosure, the term "executing instruction" refers to an instruction currently being executed by a functional unit. When the functional unit completes the execution of the instruction and returns result status information, the reorder buffer determines from the result status information whether a branch misprediction occurred. If a branch misprediction did occur, the hit mask identifies the instructions to be canceled. Because the instruction tag is received one clock cycle before the execution status, the reorder buffer performs the tag comparison and generates the hit mask in parallel with instruction execution. Thereby, reducing the time necessary to identify and cancel instructions after a mispredicted branch.

Additionally, in parallel with instruction execution, the instruction tag is used to multiplex the status bits from the instruction storage position in the reorder buffer that corresponds to the instruction tag. If the status bits are required, for example to restore the state of the reorder buffer after a mispredicted branch, they are available when the instruction execution is complete.

Broadly speaking, the present invention contemplates a reorder buffer for storing speculatively executed instructions. The reorder buffer includes an instruction storage device, an execution tag signal, a hit mask circuit, a result status signal, and a cancel mask circuit. The instruction storage device includes a plurality of instruction storage positions that hold instructions. The execution tag signal identifies an instruction prior to or during the identified instruction being executed. The hit mask circuit is coupled to the execution tag signal and generates a hit mask indicative of instruction storage positions within the instruction storage device that hold instructions to cancel to restore a program state of the reorder buffer if an exception is detected. The hit mask is generated prior to or during the execution of the identified instruction. The result status signal indicates whether the identified instruction creates an exception. The cancel mask circuit is coupled to the hit mask circuit and to the result status signal, and generates a cancel tag indicative of instructions in the reorder buffer to cancel.

The present invention further contemplates, a method for restoring a program state of a reorder buffer including the steps of: receiving an execution status signal, wherein the execution status signal identifies an instruction prior to or during the identified instruction being executed; comparing the execution status signal to tags of instructions stored in the reorder buffer; generating a hit mask that identifies instructions to cancel if an exception is detected, wherein the hit mask is generated prior to or during execution of the identified instruction; receiving a result status signal, wherein the result status signal indicates whether the identified instruction creates an exception; canceling instructions if the result status signal indicates an exception requiring the cancellation of instructions was created.

The present invention still further contemplates a microprocessor including an instruction cache, a decode unit coupled to the instruction cache, a functional unit coupled to the decode unit, a reorder buffer coupled to the functional unit and the decode unit, and a register file coupled to the reorder buffer. The reorder buffer includes an execution tag signal, a hit mask circuit, a result status signal, and a cancel mask circuit. The instruction storage device includes a plurality of instruction storage positions that hold instructions. The execution tag signal identifies an instruction prior to or during the identified instruction being executed. The hit mask circuit is coupled to the execution tag signal and generates a hit mask indicative of instruction storage positions within the instruction storage device that hold instructions to cancel to restore a program state of the reorder buffer if an exception is detected. The hit mask is generated prior to or during the execution of the identified instruction. The result status signal indicates whether the identified instruction creates an exception. The cancel mask circuit is coupled to the hit mask circuit and to the result status signal, and generates a cancel tag indicative of instructions in the reorder buffer to cancel.

BRIEF DESCRIPTION OF THE DRAWINGS

Other objects and advantages of the invention will become apparent upon reading the following detailed description and upon reference to the accompanying drawings in which:

FIG. 10 is a table of information stored for each instruction within an instruction storage position according to one embodiment of a reorder buffer.

Figure 1:
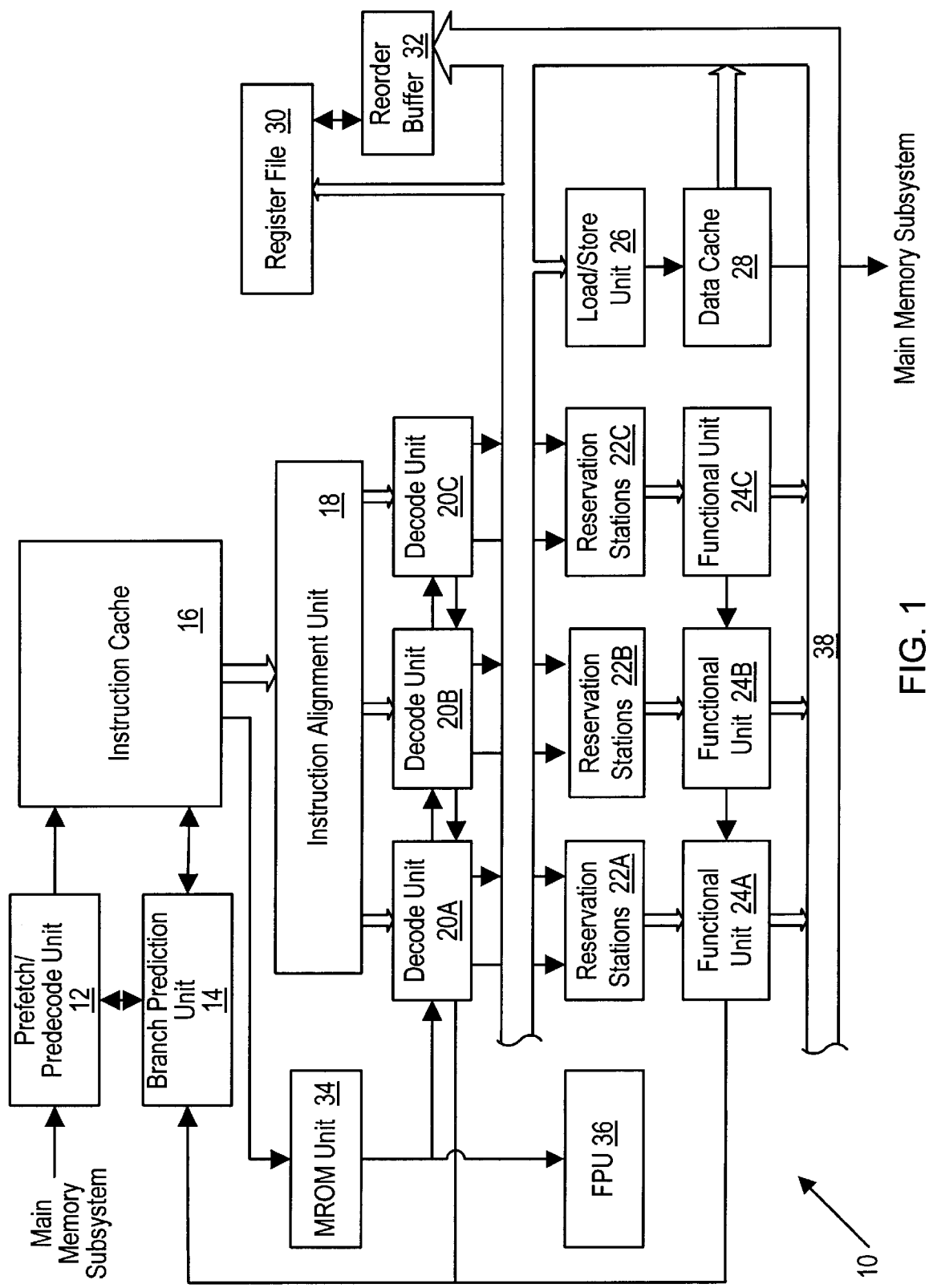
FIG. 1 is a block diagram of one embodiment of a superscalar microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a microprocessor 10 is shown. Microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, an MROM unit 34, and a floating point unit (FPU) 36. Elements referred to herein with a particular reference number followed by a letter will be collectively referred to by the reference number alone. For example, decode units 20A–20C will be collectively referred to as decode units 20.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. Finally, MROM unit 34 is coupled to decode units 20 and to FPU 36.

In one embodiment, reorder buffer 32 allocates an instruction storage position to store instruction information and instruction results for each instruction dispatched for execution. Each instruction storage position stores status, operand and result information. The term "entry" may be used interchangeably with instruction storage position. For example, a forty-five entry reorder buffer includes forty-five instruction storage positions.

In one particular embodiment, called a line-oriented reorder buffer, reorder buffer 32 allocates a line of storage to store instruction information and instruction results for one or more instructions which are concurrently dispatched by microprocessor 10. A line of storage may include several instruction storage positions. The line of storage may be sufficient for storing such information and results for a maximum number of concurrently dispatchable instructions within microprocessor 10. The line of storage is allocated regardless of the number of instructions actually concurrently dispatched (as long as at least one instruction is dispatched). During subsequent clock cycles, different lines of storage are allocated to the subsequently dispatched instructions. Additionally, instructions within a line of storage are concurrently retired from reorder buffer 32 as well. Advantageously, storage allocation within reorder buffer 32 is simplified. A fixed amount of storage is allocated each time instructions are dispatched, regardless of the number of instructions. Still further, a fixed amount of storage is deallocated upon retirement of instructions. Allocation logic is thereby dependent only upon successful dispatch of one or more instructions, not upon the number of instructions concurrently dispatched.

Microprocessor 10 employs a plurality of symmetrical issue positions for executing instructions dispatched by instruction alignment unit 18. The issue positions are symmetrical in that each issue position is configured to execute the same subset of the instruction set employed by microprocessor 10 as each other issue position. In one embodiment, each issue position is configured to execute the integer and branch instructions of the x86 microprocessor architecture. In one particular embodiment, each issue position is configured to execute fast path instructions. Other embodiments may define other subsets for the symmetrical issue positions. Additionally, the issue positions are fixed in that, once an instruction is provided to an issue position, that instruction remains within that issue position until it is executed.

Instruction cache 16 is a high speed cache memory provided to store instructions. Instructions are fetched from instruction cache 16 and dispatched to decode units 20. In one embodiment, instruction cache 16 is configured to store up to 32 kilobytes of instructions in an 8 way set associative structure having 32 byte lines (a byte comprises 8 binary bits). Instruction cache 16 may additionally employ a way prediction scheme in order to speed access times to the instruction cache. Instead of accessing tags identifying each line of instructions and comparing the tags to the fetch address to select a way, instruction cache 16 predicts the way that is accessed. In this manner, the way is selected prior to accessing the instruction storage. The access time of instruction cache 16 may be similar to a direct-mapped cache. A tag comparison is performed and, if the way prediction is incorrect, the correct instructions are fetched and the incorrect instructions are discarded. It is noted that instruction cache 16 may be implemented as a fully associative, set associative, or direct mapped configuration.

Instructions are fetched from main memory and stored into instruction cache 16 by prefetch/predecode unit 12. Instructions may be prefetched prior to instruction cache 16 recording a miss for the instructions in accordance with a prefetch scheme. A variety of prefetch schemes may be employed by prefetch/predecode unit 12. In one embodiment, prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14.

One encoding of the predecode tags for an embodiment of microprocessor 10 employing the x86 instruction set will next be described. If a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example,. a fast path instruction including two prefix bytes, a Mod R/M byte, and an SIB byte would have start, end, and functional bits as follows:

|  |  |
|---|---|
| Start bits | 10000 |
| End bits | 00001 |
| Functional bits | 11000 |

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20.

Microprocessor 10 employs branch prediction in order to speculatively fetch instructions subsequent to conditional branch instructions. Branch prediction unit 14 is included to perform branch prediction operations. In one embodiment, up to two branch target addresses are stored with respect to each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20, functional units 24, and reorder buffer 32 provide update information to branch prediction unit 14. Because branch prediction unit 14 stores two targets per cache line, some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Because microprocessor 10 supports out of order instruction execution, the state of the microprocessor must be restored when a mispredicted branch is detected. Restoring the state of the microprocessor may include canceling instructions subsequent to the mispredicted branch in reorder buffer 32 and restoring the state of status registers within reorder buffer 32. Instructions within reorder buffer 32 are canceled by setting a cancel bit in the instruction storage position allocated to an instruction. For example, when a mispredicted branch is detected, reorder buffer 32 may locate the mispredicted instruction and set the cancel bit for each instruction in reorder buffer 32 subsequent to the mispredicted branch instruction. Additionally, status information attached to each instruction in reorder buffer 32, may be read to determine whether the instruction is part of a microcode sequence and/or indicate the type of branch instruction (for example a far/near branch, a return, a call etc.). When a mispredicted branch is detected, the reorder buffer may check the status information to determine the appropriate action to take. For example, if a mispredicted branch is part of an MROM instruction, the MROM unit may handle the branch misprediction recovery procedure.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Instructions are selected independently from each set of eight instruction bytes into preliminary issue positions. The preliminary issue positions are then merged to a set of aligned issue positions corresponding to decode units 20, such that the aligned issue positions contain the three instructions which are prior to other instructions within the preliminary issue positions in program order. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program execution sequence for register read and write operations, to implement register renaming, to allow for speculative instruction execution and branch misprediction recovery, and to facilitate precise exceptions. A temporary storage position within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded (or canceled). In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order, i.e., executed before instructions that are earlier in the program execution sequence. Preceding instructions may be a branch instruction or an exception-causing instruction, in which case the speculative results may be canceled by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to three pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C. Generally speaking, an issue position refers to a block of circuitry configured to properly execute an instruction. An issue position receives an instruction and executes that instruction within the issue position.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A instruction storage position of reorder buffer 32 is reserved for each instruction which, upon decode, is determined to modify the contents of one of the real registers. Therefore, at various points during execution of a particular program, reorder buffer 32 may have one or more positions which contain the speculatively executed contents of a given register. If following decode of a given instruction it is determined that reorder buffer 32 has a previous position or positions that modify the contents of a register used as an operand in the given instruction, reorder buffer 32 forwards to the corresponding reservation station either: 1) the value in the most recently assigned position, or 2) a tag for the most recently assigned location if the value has not yet been produced by the functional unit that will eventually execute the previous instruction. If reorder buffer 32 has a position reserved for a given register, the operand value (or reorder buffer tag) is provided from reorder buffer 32 rather than from register file 30. If there is no position reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to functional units 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. Therefore, the functional units 24 are symmetrical functional units. It is noted that floating point unit 36 is also be employed to accommodate floating point operations. Floating point unit 36 may be operated as a coprocessor, receiving instructions from MROM unit 34. FPU 36 may then communicate with reorder buffer 32 for completing instructions. Additionally, functional units 24 may be configured to perform address generation for load and store memory operations performed by load/store unit 26.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program execution sequence which occur after the mispredicted branch instruction are canceled, including those which were speculatively executed and temporarily stored in load/store unit 26 and reorder buffer 32. As noted above, instructions are canceled by setting a cancel bit associated with each canceled instruction.

In one embodiment, reorder buffer 32 obtains the instruction tag from functional unit 24 prior to the execution of a particular instruction. Reorder buffer 32 detects the location of the executing instruction within the reorder buffer. Reorder buffer 32 also calculates a hit mask which identifies all instructions within reorder buffer 32 that must be canceled if a branch misprediction is detected. When functional unit 24 completes the execution of the instruction, it returns result status bits to reorder buffer 32. If the result status bits indicate that a mispredicted branch has occurred, reorder buffer 32 uses the previously calculated hit mask to cancel the instructions identified by the hit mask. If the execution status bits indicates that no mispredicted branch instruction has occurred, the hit mask calculated in the previous cycle is not used. In this manner, reorder buffer 32 can quickly cancel instructions after the result status bits are received. In one particular embodiment, the hit mask identifies all instruction in the reorder buffer subsequent to the mispredicted branch. Additionally, the instruction tag obtained prior to execution of the instruction may be used to read status bits associated with the executing instruction from reorder buffer 32 during the execution of the instruction. If the status bits are needed, for example, if the instruction is a mispredicted branch, the status bits are available when the result status is received. Therefore, the delay of multiplexing the status bits from reorder buffer 32 after the result status bits are received is reduced or eliminated. Although a mispredicted branch instruction is used as an example above, it is apparent that other types of exceptions can also be handled more efficiently by obtaining and using the instruction tag in parallel with execution. It is further apparent that status bits other than the cancel bit can be efficiently modified using the present invention. It is further apparent that the hit mask can identify a subset of the instructions other than instructions subsequent to the executing instruction in the program execution sequence. For example, the hit mask may identify instructions prior to the executing instruction.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the instruction tag identifying the instruction being executed.

Load/store unit 26 provides an interface between functional units 24 and data cache 28. In one embodiment, load/store unit 26 is configured with a load/store buffer having eight storage locations for data and address information for pending loads or stores. Decode units 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight way set associative structure. Similar to instruction cache 16, data cache 28 may employ a way prediction mechanism. It is understood that data cache 28 may be implemented in a variety of specific memory configurations, including a set associative configuration.

In one particular embodiment of microprocessor 10 employing the x86 microprocessor architecture, instruction cache 16 and data cache 28 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

Figure 2:
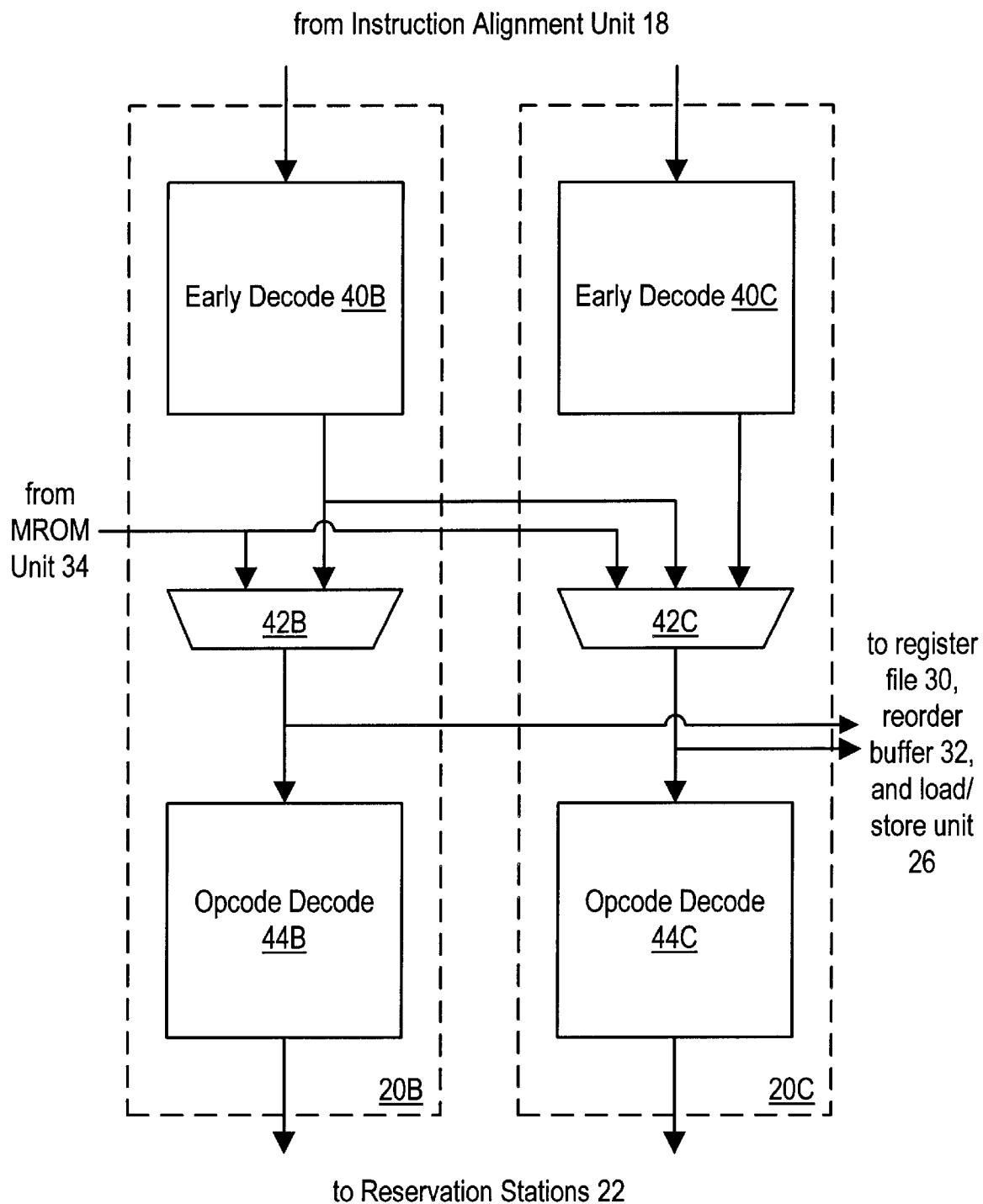
FIG. 2 is a block diagram of one embodiment of two of the decode units shown in FIG. 1.

Turning now to FIG. 2, a block diagram of one embodiment of decode units 20B and 20C are shown. Each decode unit 20 receives an instruction from instruction alignment unit 18. Additionally, MROM unit 34 is coupled to each decode unit 20 for dispatching fast path instructions corresponding to a particular MROM instruction. Decode unit 20B comprises early decode unit 40B, multiplexer 42B, and opcode decode unit 44B. Similarly, decode unit 20C includes early decode unit 40C, multiplexer 42C, and opcode decode unit 44C.

Certain instructions in the x86 instruction set are both fairly complicated and frequently used. In one embodiment of microprocessor 10, such instructions include more complex operations than the hardware included within a particular functional unit 24A–24C is configured to perform. Such instructions are classified as a special type of MROM instruction referred to as a "double dispatch" instruction. These instructions are dispatched to a pair of opcode decode units 44. It is noted that opcode decode units 44 are coupled to respective reservation stations 22. Each of opcode decode units 44A–44C forms an issue position with the corresponding reservation station 22A–22C and functional unit 24A–24C. Instructions are passed from an opcode decode unit 44 to the corresponding reservation station 22 and further to the corresponding functional unit 24.

Multiplexer 42B is included for selecting between the instructions provided by MROM unit 34 and by early decode unit 40B. During times in which MROM unit 34 is dispatching instructions, multiplexer 42B selects instructions provided by MROM unit 34. At other times, multiplexer 42B selects instructions provided by early decode unit 40B. Similarly, multiplexer 42C selects between instructions provided by MROM unit 34, early decode unit 40B, and early decode unit 40C. The instruction from MROM unit 34 is selected during times in which MROM unit 34 is dispatching instructions. During times in which early decode unit 40B detects a double dispatch instruction, the instruction from early decode unit 40B is selected by multiplexer 42C. Otherwise, the instruction from early decode unit 40C is selected. Selecting the instruction from early decode unit 40B into opcode decode unit 44C allows a fast path instruction decoded by decode unit 20B to be dispatched concurrently with a double dispatch instruction decoded by decode unit 20A.

According to one embodiment employing the x86 instruction set, early decode units 40 perform the following operations:

(i) merge the prefix bytes of the instruction into an encoded prefix byte;
(ii) decode unconditional branch instructions (which may include the unconditional jump, the CALL, and the RETURN) which were not detected during branch prediction;
(iii) decode source and destination flags;
(iv) decode the source and destination operands which are register operands and generate operand size information; and
(v) determine the displacement and/or immediate size so that displacement and immediate data may be routed to the opcode decode unit.

Opcode decode units 44 are configured to decode the opcode of the instruction, producing control values for functional unit 24. Displacement and immediate data are routed with the control values to reservation stations 22.

Since early decode units 40 detect operands, the outputs of multiplexers 42 are routed to register file 30 and reorder buffer 32. Operand values or tags may thereby be routed to reservation stations 22. Additionally, memory operands are detected by early decode units 40. Therefore, the outputs of multiplexers 42 are routed to load/store unit 26. Memory operations corresponding to instructions having memory operands are stored by load/store unit 26.

Figure 3:
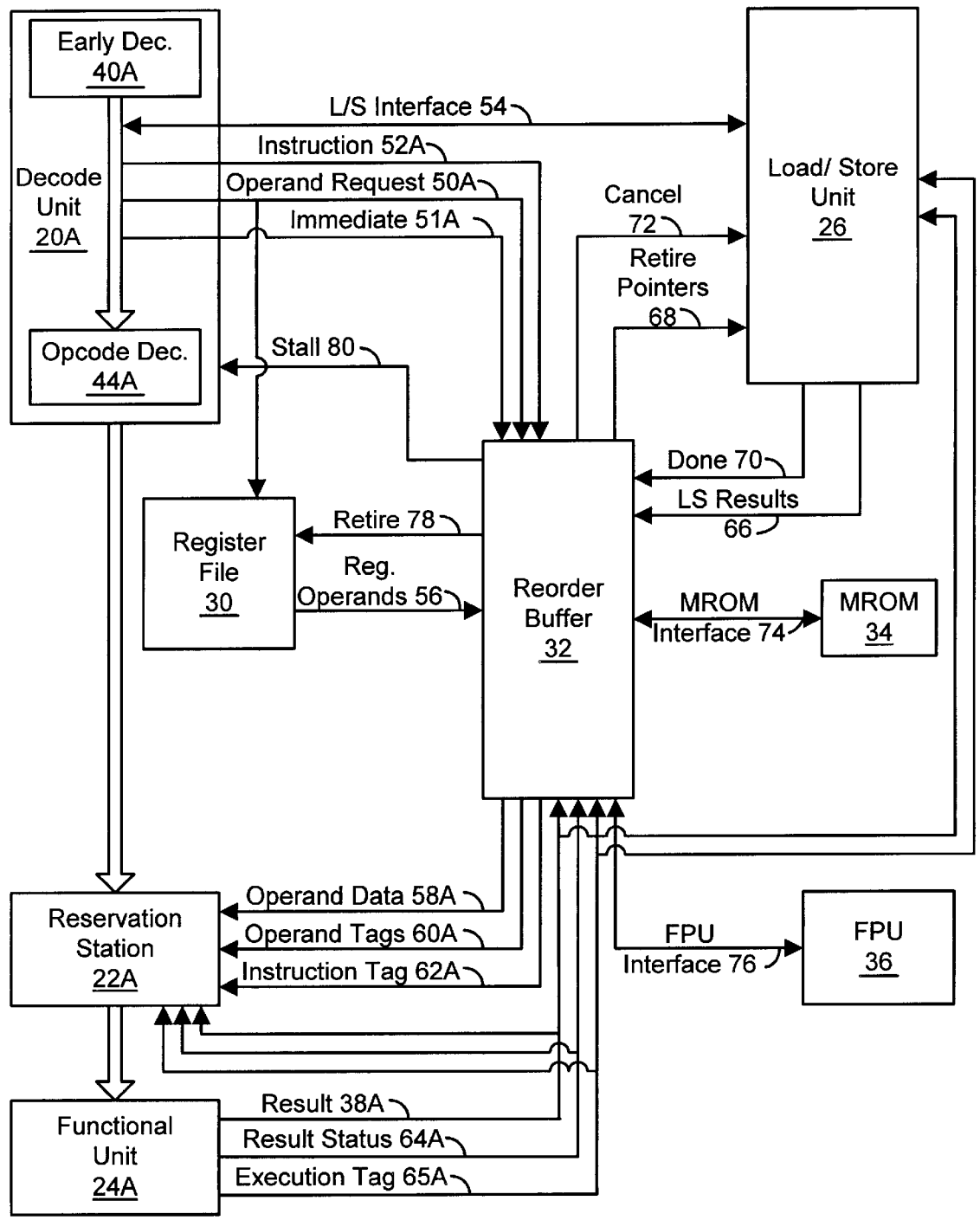
FIG. 3 is a diagram highlighting the interconnection between a decode unit, a load/store unit, an MROM unit, a floating point unit, a functional unit, a reservation station, and a register file shown in FIG. 1, according to one embodiment of the microprocessor.

Turning next to FIG. 3, a block diagram of decode unit 20A, reservation station 22A, functional unit 24A, register file 30, reorder buffer 32, FPU 36, MROM 34, and load/store unit 26 is shown. Interconnection between the units is shown according to one embodiment of microprocessor 10. Other embodiments may employ other interconnection, and additional interconnection may be employed for other purposes. Interconnection between decode units 20B–20C, reservation stations 22B–22C, functional units 24B–24C and the remaining elements of FIG. 3 may be similar.

Decode unit 20A receives an instruction from instruction alignment unit 18. Early decode unit 40A detects the operands used by the instruction and conveys indications of the register operands to reorder buffer 32 and register file 30 upon an operands request bus 50A. Register pointers are conveyed, and the source and/or destination nature of the operand is identified. For the fast path instructions described above, up to two source operands may be identified, one of which is the destination operand as well. Still further, flag operands are identified upon operand request bus 50A. In one embodiment, the flag operands are divided into three groups: the carry flag, the status and direction flags, and the remaining flags. For embodiments employing the x86 microprocessor architecture, the status and direction flags are the D, O, S, Z, P, and A flags. Immediate data is conveyed to reorder buffer 32 upon immediate bus 51A. Reorder buffer 32 relays the immediate data upon operand data bus 58A. Most x86 instructions specify either a second register operand or immediate data, but not both. Therefore, the portion of operand data bus 58A used to convey the second register operand value may be used to convey the immediate data. For branch instructions, the program counter address, an offset, and the predicted target address may be conveyed upon operand data bus 58A.

Decode unit 20A additionally conveys certain information regarding the instruction to reorder buffer 32 upon an instruction bus 52A. Exemplary instruction information employed in one embodiment of microprocessor 10 is described in more detail further below. Additionally, early decode unit 40A detects load/store memory operations specified by the instruction. An indication of the memory operations is conveyed to load/store unit 26 via load/store interface 54.

In response to the operands conveyed upon operands request bus 50A, register file 30 conveys register operand values upon register operands bus 56 to reorder buffer 32. The register values conveyed comprise the values stored in register file 30 (i.e. the values generated according to the instructions previously retired by reorder buffer 32). If reorder buffer 32 is not storing information regarding an instruction which uses the register as a destination operand, the value provided by register file 30 is conveyed to the reservation station 22A–22C which receives the instruction. For example, a register value corresponding to the instruction conveyed to reservation station 22A may be conveyed upon operand data bus 58A.

Alternatively, reorder buffer 32 may be storing information regarding an instruction which updates the requested register. If the instruction has executed and has provided an instruction result, that result is conveyed in lieu of the register value provided by register file 30 upon operand data bus 58A. If the instruction has not yet executed, the reorder buffer tag locating the instruction within reorder buffer 32 is conveyed upon an operand tags bus 60A. One operand data value and one operand tag are provided for each source operand of the instruction upon operand data bus 58A and operand tags bus 60A, respectively. Additionally, validity indicators are asserted for each data and tag value by reorder buffer 32, such that reservation station 22A may discern which is being provided for a particular operand (e.g. data or reorder buffer tag).

In addition to providing operand values and tags, reorder buffer 32 provides an instruction tag for the instruction being dispatched to reservation station 22A upon an instruction tag bus 62A. The instruction tag identifies the instruction storage position within reorder buffer 32 which stores information regarding the instruction. The instruction tag is conveyed upon execution tag 65A when the instruction is executed, such that the corresponding instruction result may be stored within reorder buffer 32. In a line-oriented reorder buffer embodiment, instruction tag bus 62A conveys a line tag identifying the line of storage which stores the instruction information. The offset tag is a constant which is inherent in the issue position to which the instruction is conveyed. In other words, functional unit 24A provides results which are always stored at a particular offset within the lines of storage within reorder buffer 32.

In addition to storing the operand values and tags corresponding to an instruction, reservation station 22A receives the decoded instruction provided by opcode decode unit 44A. When each of the source operand values corresponding to the instruction have been provided by reorder buffer 32 or have been captured from result buses 38, the instruction may be selected for execution by functional unit 24A. Upon selecting the instruction for execution, reservation station 22A conveys the decoded instruction and corresponding operands to functional unit 24A.

Functional unit 24A executes instructions received from reservation station 22A and conveys the result generated on result bus 38A. In one embodiment, the instruction tag is forwarded on execution tag bus 65A as the instruction begins execution. The instruction tag may be forwarded in this manner because it is unchanged during instruction execution, whereas the instruction result must be generated by functional unit 24A and then forwarded. It is noted that result bus 38A and execution tag bus 65A are coupled to reservation stations 22 (such as reservation station 22A shown in FIG. 3) for providing forwarded results thereto. Still further, result bus 38A and execution tag bus 65A are coupled to load/store unit 26. It is further noted that the execution tag and the instruction result may be forwarded on the same bus. Functional unit 24A provides the logical address of a memory operation specified by the instruction being executed therein to load/store unit 26 via result bus 38A or execution tag bus 65A.

Functional unit 24A additionally forwards a result status upon a result status bus 64A to reorder buffer 32. The result status indicates any exceptions associated with the instruction, such that reorder buffer 32 may take appropriate corrective actions. Result status bus 64A additionally is used to indicate execution of a branch instruction which is mispredicted. Corrective actions may include hardware supported correction, trapping to a microcode routine within MROM unit 34, or trapping to a software routine stored at a particular address identified for the instruction. Corrective action for a mispredicted branch instruction typically includes canceling instructions later in the program execution sequence, and restoring the state of the microprocessor to the state prior to the mispredicted branch.

Reorder buffer 32 interfaces to load/store unit 26 to allow completion of load/store memory operations. Load/store unit 26 may be configured to speculatively execute load and store memory operations which hit in data cache 28. Load memory operation results (along with a reorder buffer tag including both line tag and offset tag portions) are conveyed upon an LS results bus 66 to reorder buffer 32. Additionally, the load results are forwarded to reservation stations 22 in order to provide operands thereto. In one embodiment, up to two results may be provided upon LS results bus 66.

Load/store unit 26 may be configured not to speculatively perform memory operations which miss data cache 28. Reorder buffer 32 indicates upon retire pointers bus 68 which memory operations are otherwise in position to be retired but have not yet executed. Load/store unit 26 then performs the indicated memory operations and returns results upon LS results bus 66. Additionally, load/store unit 26 asserts a corresponding signal upon a done bus 70. Reorder buffer 32 recognizes the asserted done signal as a completion of the memory operation indicated upon retire pointers bus 68. Since load/store unit 26 may execute up to two memory operations concurrently according to one embodiment, retire pointers bus 68 may carry up to two reorder buffer tags. Accordingly, done bus 70 includes two done signals corresponding to each of the reorder buffer tags.

A cancel bus 72 is included between reorder buffer 32 and load/store unit 26 as well. Cancel bus 72 includes a signal for each reorder buffer tag conveyed upon retire pointers bus 68. If the corresponding cancel signal is asserted, then reorder buffer 32 is indicating that the corresponding memory operation should be deleted from load/store unit 26. Memory operations are deleted when they are subsequent to a mispredicted branch or an instruction which experienced an exception, for example.

Reorder buffer 32 interfaces with MROM unit 34 and FPU 36 via MROM interface 74 and FPU interface 76, respectively. MROM interface 74 is used (among other things) to implement branch misprediction recovery for branch instructions which originate in MROM unit 34 as opposed to the original instruction stream. If a mispredicted branch is encountered and the branch instruction originated within MROM unit 34, reorder buffer 32 informs MROM unit 34 via MROM interface 74. MROM interface 74 performs branch misprediction recovery for such mispredicted branch instructions.

Since FPU 36 operates as a coprocessor, several signals are used to synchronize completion of an instruction within FPU 36. These signals are included within FPU interface 76. Generally, a signal may be asserted to FPU 36 indicating that a particular floating point instruction may be retired. When the floating point instruction is retired, FPU 36 asserts a second signal. Additionally, upon detection of a floating point synchronization instruction, another set of signals are asserted to synchronize the completion of the instruction.

Instructions are retired from reorder buffer 32 in program order, i.e., in the original program execution sequence. Upon retirement, the corresponding register results are conveyed upon a retire bus 78 to register file 30. In a line-oriented reorder buffer embodiment, multiple instructions are allocated to a line of storage and the instructions within a line of storage are retired simultaneously. Since more than one instruction within the instructions may update the same register, reorder buffer 32 employs a set of bits within each line referred to as the last in line (LIL) bits. The LIL bits are set for each instruction which is the last instruction within the line to update a particular register. One bit is included for each portion of the register (i.e. EAX, AH, and AL, wherein AX is represented by both AH and AL being set). Effectively, these bits act as byte enables for updating the register. Therefore, an instruction which updates AH and another instruction which updates AL may retire simultaneously. For embodiments employing a microprocessor architecture which does not allow updates to only a portion of a register, one LIL bit is included for each instruction.

Finally, reorder buffer 32 employs a stall line 80 for stalling instruction dispatch. Instruction dispatch may be stalled for many reasons, including: reorder buffer, reservation station, or load/store buffer full conditions; a narrow to wide stall; instruction serialization; etc. Upon detection of a stall condition, reorder buffer 32 asserts a stall signal upon stall line 80. If decode unit 20A receives an asserted stall signal during a clock cycle and decode unit 20A is attempting to dispatch an instruction, decode unit 20A provides that same instruction during a subsequent clock cycle. In this manner, an instruction which cannot be dispatched during a particular clock cycle is continuously redispatched until the stalling condition terminates.

Figure 4:
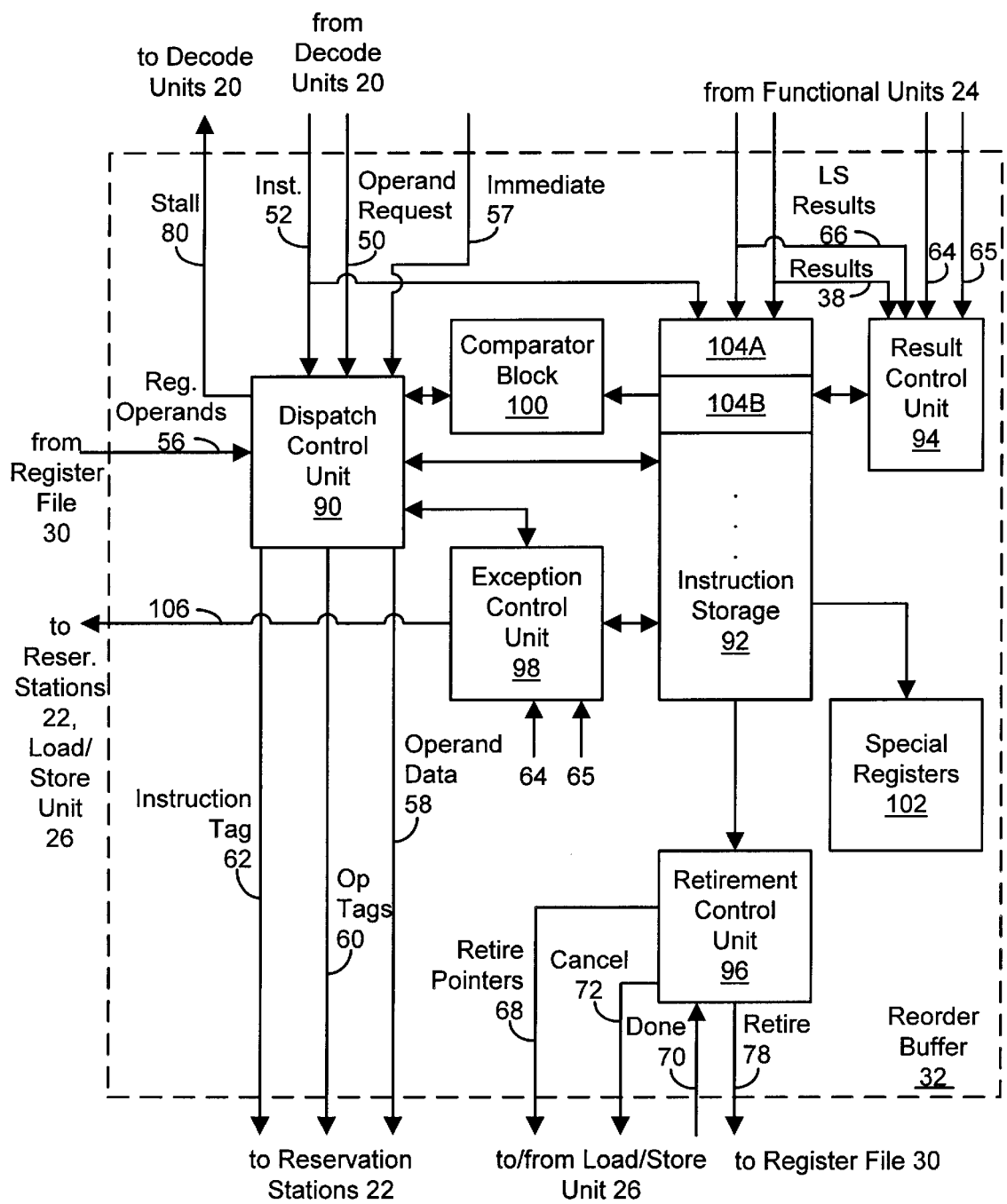
FIG. 4 is a block diagram of one embodiment of the reorder buffer shown in FIG. 1.

Turning now to FIG. 4, a block diagram of one particular embodiment of reorder buffer 32 is shown. Other particular embodiments are contemplated as well. As shown in FIG. 4, reorder buffer 32 includes a dispatch control unit 90, an instruction storage 92, a result control unit 94, a retirement control unit 96, an exception control unit 98, a comparator block 100, and a special registers block 102. Buses which are suffixed in FIG. 3 with an "A" are shown in FIG. 4 without the "A" to represent the bus from decode unit 20A as well as similar buses from decode units 20B–20C. For example, operand request bus 50 includes operand request bus 50A as well as an operand request bus 50B from decode unit 20B and an operand request bus 50C from decode unit 20C.

Dispatch control unit 90 is coupled to exception control unit 98, instruction storage 92, and comparator block 100. Comparator block 100 is further coupled to instruction storage 92, as is exception control unit 98. Result control unit 94, retirement control unit 96, and special registers block 102 are coupled to instruction storage 92 as well.

Dispatch control unit 90 receives instruction information and corresponding operand identifiers upon instruction buses 52 and operand request buses 50, respectively. Furthermore, corresponding immediate data (if any) is received upon immediate buses 51. In a line-oriented reorder buffer, upon receipt of at least one valid instruction from decode units 20, dispatch control unit 90 allocates a line of storage within instruction storage 92. Instruction storage 92 includes multiple lines of storage, such as lines 104A and 104B shown in FIG. 4. The instruction information received upon instruction bus 52 is stored into the line of storage, as well as an indication of the destination operand of the instruction. Dispatch control unit 90 provides the line tag identifying the allocated line of storage upon instruction tag bus 62 to reservation stations 22. Reservation stations 22 may thereby identify the line of storage 104 which stores the instruction, and the offset tag is inherent in the issue position of the receiving reservation station 22A–22C.

Dispatch control unit 90 further provides dependency checking for each source operand. Comparator block 100 is provided for performing dependency checking. A comparator within comparator block 100 is assigned to each destination operand which may be stored within instruction storage 92 and to each source operand which may be requested upon operand request buses 50. The comparator compares the destination operand to the source operand to detect any dependencies with instructions outstanding within reorder buffer 32. Because x86 instructions allow a portion of a register to be updated and accessed, the comparators compare not only the register identifiers but the respective sizes of the updates. If a dependency is detected, the corresponding reorder buffer tag (i.e. both line tag and offset tag) is forwarded upon operand tags bus 60. Additionally, if an instruction result has been provided for the instruction upon which the dependency is detected, the result is provided upon operand data bus 58. If no dependency is detected, the register file value provided upon register operands bus 56 is provided upon operand data bus 58.

In one embodiment, instruction storage 92 stores a last-in-buffer indication for each instruction. The last-in-buffer indication indicates whether or not the instruction is the last (in the program execution sequence) within the buffer to update the destination operand of that instruction. Comparators within comparator block 100 include the last-in-buffer indication in their comparisons, such that only the last instruction is detected as a dependency. Since only the correct dependency is identified by comparator block 100 (as opposed to all instructions within the buffer which update the same destination), logic which determines the correct dependency from the comparator outputs may be simplified. Additionally, since one of the source operands is also the destination, resetting the last-in-buffer indication when a new instruction is dispatched requires little extra logic. When the comparator corresponding to a particular instruction within instruction storage 92 asserts its output signal and the source operand being compared is also the destination of the instruction being dispatched, the last-in-buffer indication of that particular instruction is reset. The last-in-buffer indication is set for each instruction dispatched.

For embodiments employing the x86 instruction set, three types of dependencies may exist: an equal-sized dependency, a narrow-to-wide dependency, and a wide-to-narrow dependency. An equal-sized dependency exists if both the source operand and the destination operand being compared update the same portion of the same register. A narrow-to-wide dependency exists if the source operand accesses a larger portion of the register than the destination operand updates. Conversely, a wide-to-narrow dependency exists if the source operand accessed a smaller portion of the register than the destination operand updates. Equal-sized dependencies and wide-to-narrow dependencies may be handled by forwarding the destination operand's reorder buffer tag or result value. Narrow-to-wide dependencies are somewhat more problematic, since the instruction corresponding to the destination operand does not provide the entire value used by the source operand. Dispatch control unit 90 may stall the instruction corresponding to the narrow-to-wide dependency for such embodiments via assertion of a stall signal upon stall line 80. The stall signal may remain asserted until the destination operand is retired or discarded from instruction storage 92.

Instruction results are provided by functional units 24 upon result buses 38, while load/store unit 26 provides load memory operation results upon LS results bus 66. Result control unit 94 examines the instruction tags provided by functional units 24 and load/store unit 26 to determine which lines of storage and which instructions within the lines receive the results. As noted above, in line-oriented reorder buffers, functional units 24 provide a line tag only. The offset tag is a constant for each functional unit. However, load/store unit 26 is not associated with a fixed, symmetrical issue position in the manner of functional units 24. Therefore, load/store unit 26 provides both the line tag and the offset tag for each result. Result control unit 94 directs instruction storage 92 to store each result in the appropriate line and offset.

Additionally, result control unit 94 receives an exception status for each instruction upon result status bus 64. If a functional unit 24 or load/store unit 26 reports an exception while executing an instruction, result control unit 94 signals exception control unit 98 directly regarding certain exceptions (e.g. branch misprediction). Alternatively, exception control unit 98 may directly detect an exception. Result control unit 94 may also store the exception status into instruction storage 92 at the line and offset storing the corresponding instruction. Alternatively, exception control unit 98 may detect other exceptions as the corresponding instructions are retired from instruction storage 92.

Retirement control unit 96 is configured to retire instructions from instruction storage 92. Instructions are retired in program order. Generally, in a line-oriented reorder buffer, the instructions within a line of storage 104 are retired simultaneously. Therefore, retirement control unit 96 monitors the line of storage 104 storing the instruction which is foremost in program order among the instructions within instruction storage 92 (the "oldest line"). When each of the instructions within the oldest line have been executed and provided results, the instructions are retired. Instruction results which update register file 30 are conveyed upon retire bus 78 along with the corresponding last-in-line bits. The line of storage is then deallocated, freeing storage space for a set of concurrently dispatched instructions.

Retirement control unit 96 further scans the instructions within instruction storage 92 to detect load/store memory operations which have not yet completed and which are no longer speculative. A load/store memory operation is no longer speculative if the instructions prior to the instruction corresponding to the load/store memory operation have completed without exception. Retirement control unit 96 conveys the reorder buffer tag of the instruction corresponding to the non-speculative load/store memory operation upon retire pointers bus 68 to load/store unit 26. Load/store unit 26 may subsequently select the memory operation for access to data cache 28. Upon completion of the memory operation, load/store unit 26 asserts a done signal upon done bus 70. Retirement control unit 96 may then mark the corresponding memory operation as completed within instruction storage 92. If the remaining instruction operations associated with the instruction corresponding to the completed memory operation have also been performed, the instruction is ready for retirement.

Retirement control unit 96 may further operate signals upon cancel bus 72 in conjunction with retire pointers bus 68. If an instruction corresponding to a load/store memory operation has been canceled (due to exception conditions), the cancel signal is asserted when the reorder buffer tag of the instruction is conveyed upon retire pointers bus 68. Load/store unit 26 discards the identified memory operation and asserts the corresponding done signal. Alternatively, exception control unit 98 may operate the cancel signals.

Upon retirement of instructions which update special registers within special registers block 102, the special registers are updated. In one embodiment, the special registers within special registers block 102 include: the program counter register, which stores an address indicative of the last instruction to be retired; an MROM program counter register, which stores a ROM address indicative of the last retired instruction from MROM unit 34; a floating point program counter register, which stores an address indicative of the last floating point instruction to be retired; recovery registers for the program counter and ESP for use with branch and CALL/RETURN instructions whose targets experience a segment limit violation; the flags registers; a floating point opcode register storing the opcode of the last floating point instruction to be retired; and a debug register.

Exception control unit 98 handles recovery from exceptions experienced by microprocessor 10. Exception control unit 98 handles exception recovery of reorder buffer 32, reservation station 22, load/store unit 36, and other portions of microprocessor 10 that require recovery from an exception. An exceptions control bus 106 is provided by exception control unit 98 to indicate exceptions and corrective actions to reservation stations 22 and load/store unit 26. Any suitable set of corrective actions may be performed.

In one embodiment, branch misprediction exception recovery begins upon detection of the branch misprediction, while exception recovery for other exceptions begins upon retirement of the corresponding instruction. Branch misprediction recovery in reservations stations 22 and load/store unit 26 may be performed in many ways. For example, exception control unit 98 may provide the instruction tag of the branch instruction upon exceptions control bus 106. Instructions subsequent to the branch instruction are discarded by comparing the corresponding instruction tags to the branch instruction tag. For this method, reservation stations 22 and load/store unit 26 must be able to determine program order from the values of the instruction tags. As another example, exception control unit 98 may assert a branch misprediction signal upon exceptions control bus 106. Reservation stations 22 and load/store unit 26 may note the instructions which are stored therein upon receipt of the asserted signal. Subsequently, exception control unit 98 may indicate that the mispredicted branch instruction is retired. Instructions remaining within reservation stations 22 and load/store unit 26 upon receipt of the retirement indication may then be discarded if the instructions are noted as stored therein upon detection of the mispredicted branch. Other instructions which arrived subsequent to detection of the mispredicted branch are from the corrected path and therefore are retained. In yet another example, load/store memory operations subsequent to the mispredicted branch in program order may be canceled via cancel bus 72. Random data may be forwarded for the canceled load memory operations, and other instructions which are subsequent to the mispredicted branch may be allowed to execute and forward results. The instructions are then discarded by reorder buffer 32.

In addition to causing instruction discard in other portions of microprocessor 10 and cancellation of speculative instructions in reorder buffer 32, exception control unit 98 directs dispatch control unit 98 to "redispatch" the instructions within instruction storage 92 which are prior to the mispredicted branch in the program execution sequence. Since instructions subsequent to the mispredicted branch instruction may be indicated to be last-in-buffer updates to one or more registers, this "redispatch" allows the dependency checking logic of dispatch control unit 90 to recover the state of the last-in-buffer indications for the instructions prior to the mispredicted branch. The "redispatch" is performed internal to reorder buffer 32 (i.e. other portions of microprocessor 10 are unaffected). In one embodiment, dispatch control unit 90 begins with the oldest line of instructions and redispatches each line of instructions up to and including the line of instructions including the mispredicted branch instruction (save the instructions within the line which are subsequent to the mispredicted branch instruction).

In another embodiment, redispatch begins with the line of instructions including the mispredicted branch instruction and proceeds in inverse program order. If an update to a register is detected, the LIB bits are set appropriately. Additionally, dispatch control unit 90 notes that the LIB bits for that register have been set during the recovery. Updates to that register (or portion thereof) are ignored in subsequent redispatches since the redispatch is proceeding in inverse program order. This embodiment has the advantage that lines of instructions prior to the mispredicted branch which are retired prior to the completion of mispredicted branch recovery are not redispatched. Branch misprediction recovery may thereby complete in fewer clock cycles than other branch misprediction recovery mechanisms.

Figure 5:
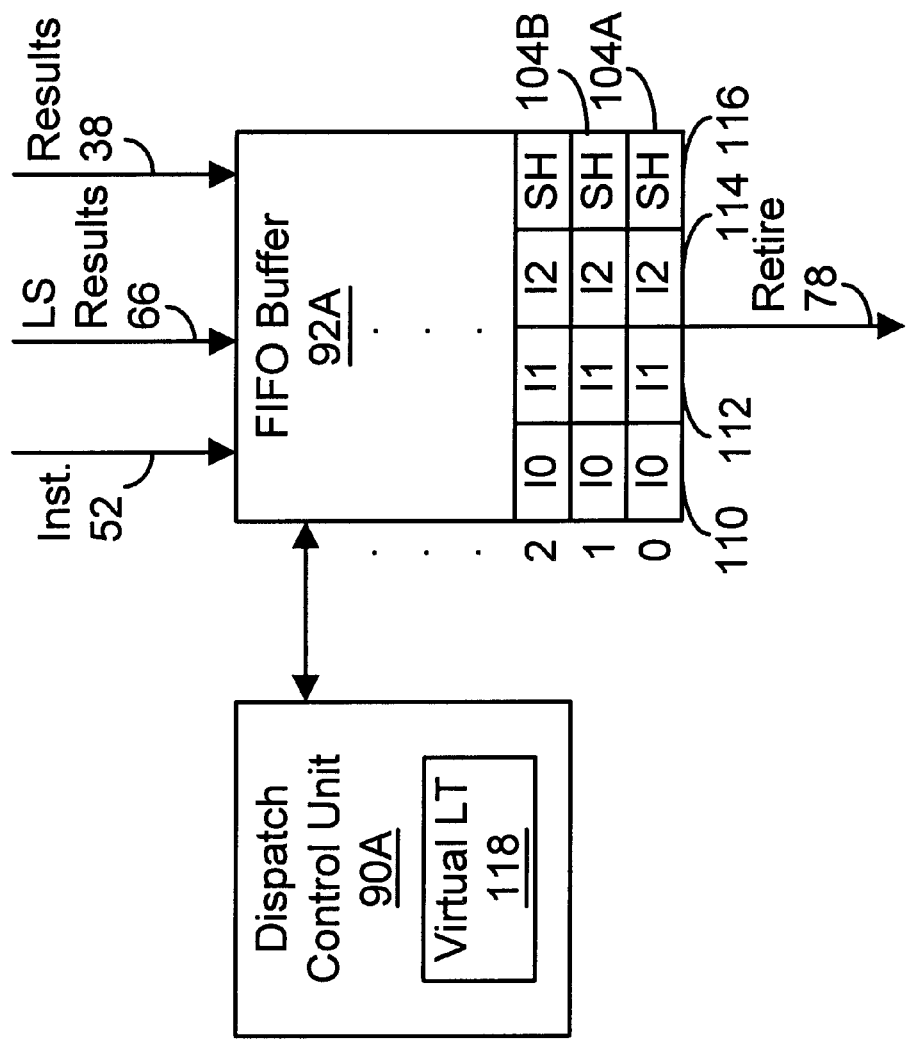
FIG. 5 is a block diagram of a dispatch control unit and a FIFO buffer according to one embodiment of the reorder buffer shown in FIG. 4.

Turning now to FIG. 5, a block diagram depicting one implementation of instruction storage 92 is shown. The implementation shown in FIG. 5 is a first-in, first-out (FIFO) buffer 92A. Additionally, an embodiment of dispatch control unit 90 (dispatch control unit 90A) is shown.

A FIFO buffer generally comprises multiple storage locations which operate as a queue. As the name implies, the first item placed in a FIFO buffer is the first item to be removed from the buffer. The "items" for FIFO buffer 92A comprise lines of instructions. For example, the embodiment of FIFO buffer 92A illustrated in FIG. 5 stores up to three instructions per line. Therefore, each line of storage includes a first instruction (I0) field 110, a second instruction (I1) field 112, and a third instruction (I2) field 114. Additionally, certain information which is shared by the instructions in the line is stored in a shared (SH) field 116. A line of storage 104 is allocated to one or more concurrently dispatched instructions by dispatch control unit 90A. Although the line of storage 104 shown in this implementation includes up to three instructions, other embodiments of FIFO buffers or instruction storages may include any number of instructions.

FIFO buffer 92A shifts the lines of instructions stored therein such that the oldest line of instructions is in the bottom storage location of FIFO buffer 92A (e.g. the location labeled zero in FIG. 5). The "bottom" of a FIFO buffer is the storage location which is defined to store the item which is next to be removed from the FIFO buffer. When the item at the bottom is removed, the remaining items are shifted within the FIFO buffer such that the item which was second to the bottom of the FIFO buffer becomes the item stored at the bottom. For FIFO buffer 92A, each time a line of instructions is retired, FIFO buffer 92A is shifted such that the line of instructions which was next to the bottom of FIFO buffer 92A becomes the line of instructions stored at the bottom. In this manner, the storage location which is defined to be the bottom of FIFO buffer 92A is the only storage location accessed by retirement control unit 76 in order to retire instructions.

Dispatch control unit 90A allocates a line within FIFO buffer 92A for each set of concurrently dispatched instructions received by reorder buffer 32. Each line of FIFO buffer 92 includes one or more instruction storage positions. When FIFO buffer 92A is empty, dispatch control unit 90A allocates location zero. If location zero is occupied and location one is empty, location one is allocated. Similarly, other locations within FIFO buffer 92A are allocated if all the locations between that location and the bottom of FIFO buffer 92A are occupied with instructions. The location numbers shown in FIG. 5 next to FIFO buffer 92A are therefore physical line tags which identify one line of storage within FIFO buffer 92A from the other lines of storage within FIFO buffer 92A.

Because instruction information and results are shifted between lines of storage 104 within FIFO buffer 92A, physical line tags are unsuitable for use in identifying a particular instruction. The physical line tag changes as instructions are retired from FIFO buffer 92A. Therefore, dispatch control unit 90A assigns a virtual line tag to a set of concurrently dispatched instructions. The virtual line tag is called a reorder buffer tag. The reorder buffer tag is stored in the shared field 116 of the line of storage allocated to the instructions. As the line of instructions is shifted between lines of storage 104 within FIFO buffer 92A, the reorder buffer tag is moved along as well. Therefore, result control unit 94 may search the reorder buffer tags stored within FIFO buffer 92A in order to locate the line of storage 104 storing an instruction for which a result is being provided.

Dispatch control unit 90A includes a storage location 118 which stores the reorder buffer tag to be allocated to the next set of concurrently dispatched instructions received by reorder buffer 32. When dispatch control unit 90A allocates a line of storage to the set of concurrently dispatched instructions, the reorder buffer tag stored in storage location 118 is incremented. If lines of instructions are discarded due to branch misprediction, the reorder buffer tag may be reset to the reorder buffer tag subsequent to the reorder buffer tag assigned to the mispredicted branch instruction. The reorder buffer tag is the tag conveyed to reservation stations 22, load/store unit 26, and any other portions of microprocessor 10 which receive reorder buffer tags.

Figure 6:
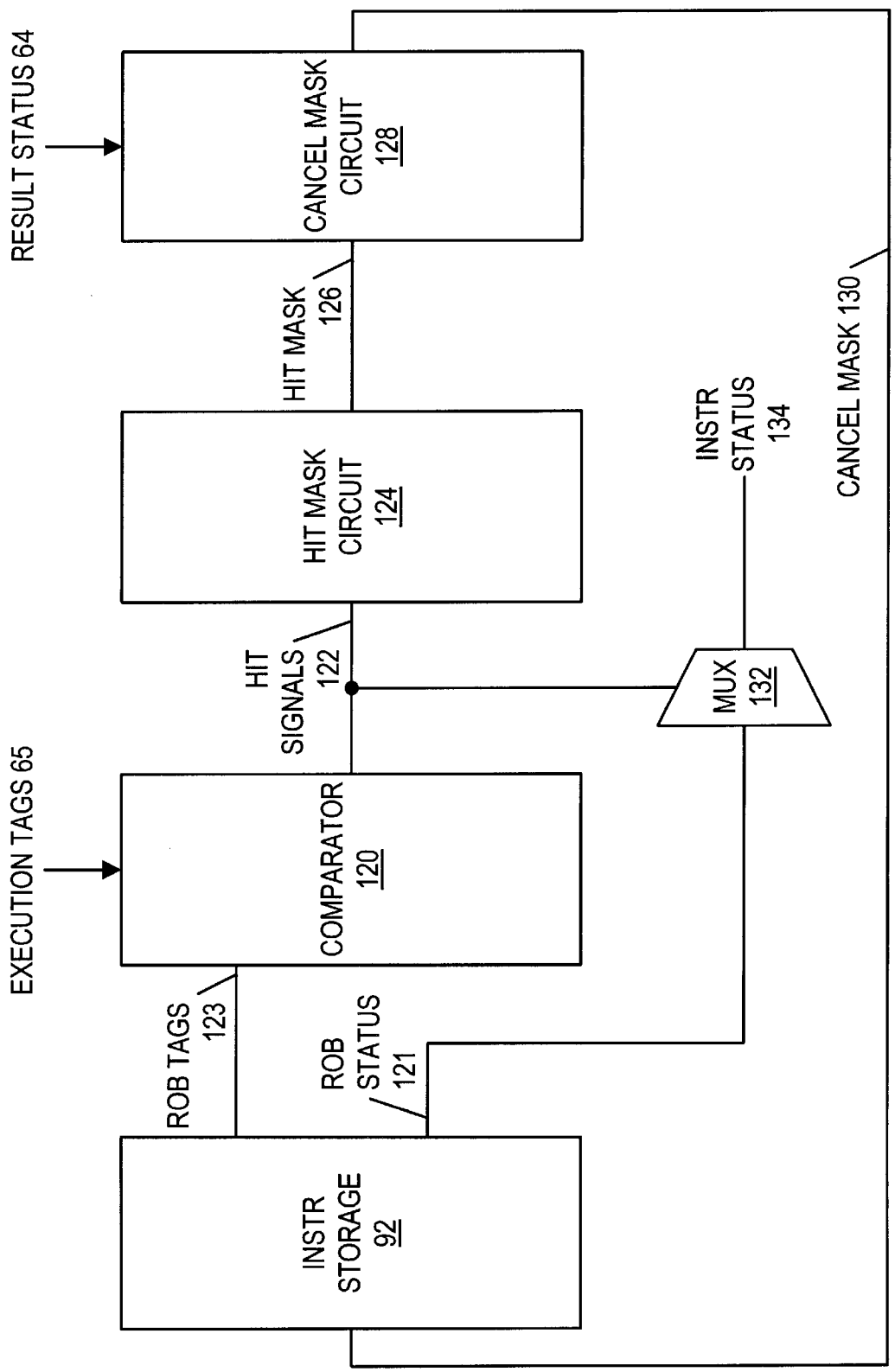
FIG. 6 is a block diagram of a portion of an exception control unit and an instruction storage.
Figure 7:
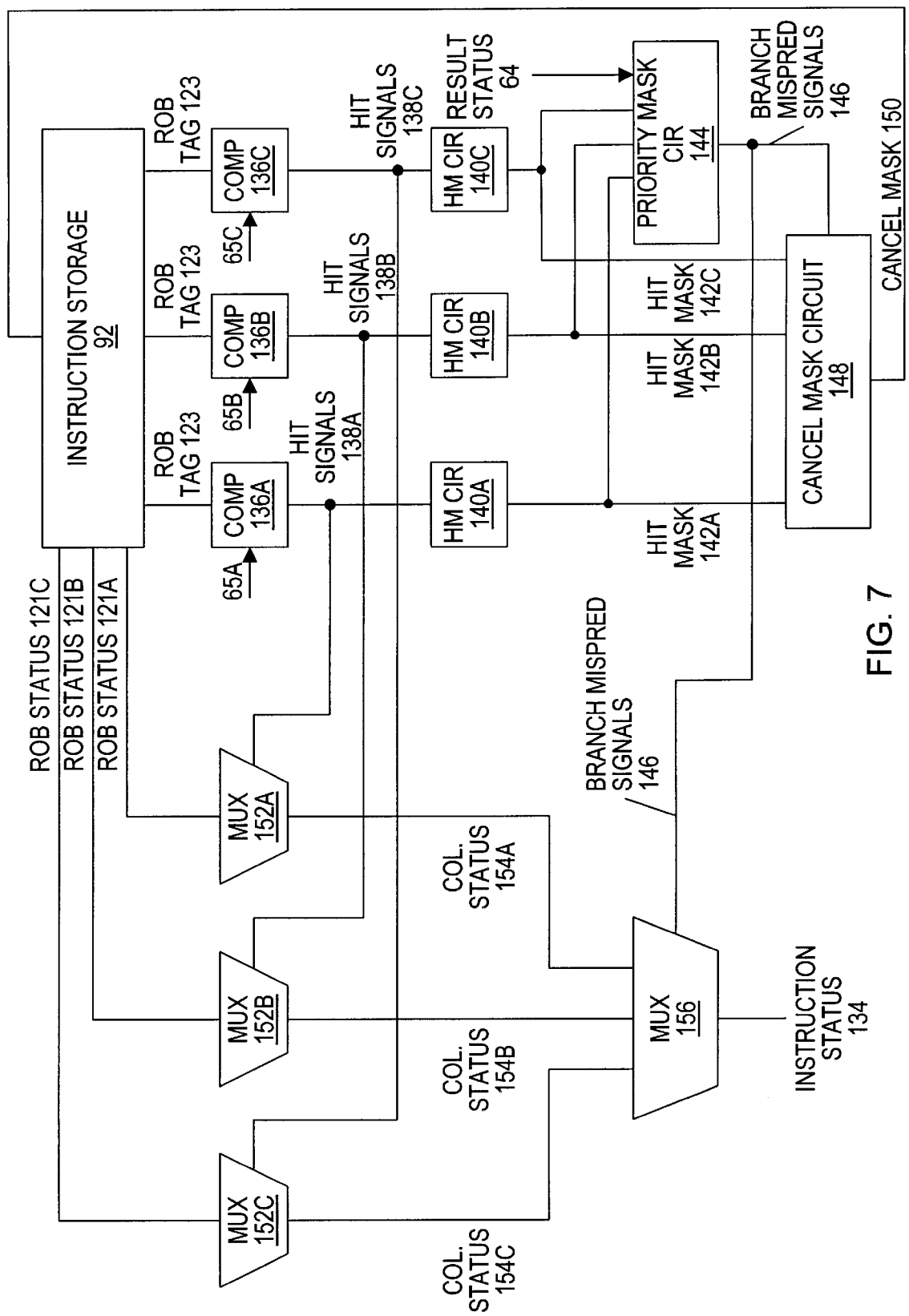
FIG. 7 is a block diagram of a portion of an exception control unit and an instruction storage for use with multiple functional units.

Turning now to FIGS. 6 and 7, mechanisms are next considered that accommodate expedient invalidation of speculative results in a reorder buffer when branch mispredictions or other exceptions occurs. FIG. 6, which may be provided within a processor that executes a single result in a cycle, is a block diagram of a portion of an exception control unit and an instruction storage. FIG. 6 includes instruction storage 92, a comparator 120, a hit mask circuit 124, a cancel mask circuit 128, and a multiplexer 132. Because only one instruction result is received during a given clock cycle, priority between exceptions does not have to be determined. When a functional unit (not shown) begin execution of an instruction, a hit mask 126 is generated from the instruction tag of the executing instruction (execution tag 65). Hit mask 126 is used to identify and cancel all instructions subsequent in the program execution sequence to the executing instruction if a mispredicted branch occurs. Because hit mask 126 is generated in parallel with the execution of the instruction, the time delay from the receipt of the result status 64, which indicates whether an branch misprediction has occurred, to setting the cancel bits in instruction storage 92 is reduced. If result status 64 indicates that no branch misprediction has occurred, the hit mask is not used. Additionally, instruction status information stored in instruction storage 92 is multiplexed from the instruction storage position corresponding to the executing instruction. The instruction status information from instruction storage 92 is used by exception control unit 98 to determine the appropriate recovery action for the exception. The multiplexing of instruction status information from instruction storage 92 is also done in parallel with the execution of the instruction. Therefore, the time delay from the receipt of the result status, indicating that an exception has occurred, to the availability of the instruction status is reduced.

When functional unit 24 begins execution of an instruction, the instruction tag of the executing instruction, referred to as execution tag 65, is sent to comparator 120. Comparator 120 also receives the reorder buffer tags 123 for the instruction storage positions in instruction storage 92. Comparator 120 compares execution tag 65 to reorder buffer tags 123. Comparator 120 outputs a plurality of hit signals 122. In one embodiment, there is one hit signal for each instruction storage position in instruction storage 92. Hit signal 122 for the instruction that matches execution tag 65 is activated and all other hit signals are deactivated.

Therefore, the one activated hit signal 122 represents the instruction storage position of the instruction currently being executed by functional unit 24.

Hit mask circuit 124 generates a hit mask 126 from hit signals 122. Generally speaking, hit mask circuit 124 is a circuit that indicates which speculatively executed instructions within the reorder buffer are subsequent in program order to an instruction that creates an exception. Hit mask 126 indicates which instructions should be canceled in the event that a mispredicted branch, or other exception requiring instructions to be canceled, is detected. In one embodiment, hit mask 124 identifies all instructions in instruction storage 92 subsequent in the program execution sequence to the instruction currently being executed (as indicated by execution tag 65). Therefore, each bit in hit mask 126 that corresponds to an instruction prior to the executing instruction is deactivated, the bit of hit mask 126 that corresponds to the executing instruction is activated, and each bit in hit mask 126 that corresponds to an instruction subsequent to the executing instruction is activated.

When functional unit 24 completes the execution of the instruction, result status bits 64 are received by cancel mask circuit 128. If result status bit 64 indicates a branch misprediction has occurred, or another exception that requires the canceling of instructions, cancel mask circuit 128 invalidates all instructions in instruction storage 92 subsequent in program order to the mispredicted branch. Because hit mask 126 is calculated in parallel with the execution of the instruction, the propagation delay from receiving result status bit 64 to invalidating the instructions is reduced. If no exception is detected, hit mask 126 is not utilized.

In one embodiment, a bit in hit mask 126 that corresponds to an instruction storage position is activated if the hit signal 122 for that instruction storage position or an instruction storage position allocated to an instruction earlier in the program execution sequence is activated. The hit mask bit for an entry is deactivated if any hit signal 122 for an instruction storage position allocated to an instruction later in program order is activated. In one specific embodiment, the following logical equations are used to generate hit mask 126 (for an N entry reorder buffer):

hit mask(N)=1 hit mask $(n)$=~$hit(n+1)$ & ~$hit(n=2)$ & . . . & ~$hit(n+k)$ where (n+k$\leq$N) for (N/2<n<N)

hit mask$(n)$=$hit(n)|hit(n-1)|hit(n=2)|$. . .| hit (0) for (n$\leq$N/2)

Although the hit mask described above activates the bit that corresponds to the mispredicted branch instruction, the mispredicted branch instruction is not actually invalidated. Cancel mask circuit 128 effectively shifts hit mask 124 before invalidating instructions. Therefore, an instruction "n" is invalidated if the hit mask bit corresponding to instruction "n–1" is activated. The earliest instruction in the reorder buffer is never canceled. Hit mask 124 is generated in this way because hit mask 124 is used for other functions in microprocessor 10. For example, in one embodiment, the hit mask is also used to set a branch misprediction status bit. If a mispredicted branch instruction is detected, the branch misprediction status bit for the line of the reorder buffer in which the mispredicted branch is stored is asserted. The branch misprediction status bit for each line of the reorder buffer that stores instructions later in the program execution sequence are also asserted. By asserting the branch misprediction status bit in this manner, unretired branch mispredictions within the reorder buffer can be easily detected by checking the branch misprediction status bit of the reorder buffer line that stores the last instruction in the program order. Hit mask 124 can also be calculated to only activate the bits that correspond to instructions subsequent to the mispredicted branch. This alternative would eliminate the need to shift the hit mask prior to invalidating instructions.

If there is no hit signal in a cycle, the above equations will generate a hit mask with the upper half all 1's and the lower half all 0's. This could happen, for example, if the functional unit is not completing a result in that cycle. The hit mask generated if no hit signal is activated erroneously indicates that the middle instruction in the instruction storage is being executed. This erroneous indication, however, will not cause a problem, because the hit mask is not used unless the execution status bits indicate an exception has occurred. Because no instruction execution is completing, no exception will occur.

To determine the appropriate recovery action to take during recovery from an exception, exception control unit 98 (FIG. 4) detects ROB status information 121 from instruction storage 92. ROB status information 121 is stored in each instruction storage position and indicates among other things whether an instruction is a fast path or MROM instruction and the type of branch instruction. For example, if a mispredicted branch is part of an MROM instruction, exception recovery may be handled by MROM unit 34 rather than branch prediction unit 14. To reduce the delay of multiplexing ROB status information 121 from instruction storage 92, ROB status information 121 is detected in parallel with the execution of the instruction. Multiplexer 132 is connected to ROB status information 121 of each instruction storage position. For example, if reorder buffer 32 is a non-line oriented reorder buffer and stores forty-five speculative instructions, instruction storage 92 has forty-five instruction storage positions and multiplexer 132 is a forty-five to one multiplexer. Hit signals 122 control the multiplexing of ROB status information 121. As discussed above, the hit signal that corresponds to the executing instruction is activated. Multiplexer 132 uses the hit signals to select ROB status information 121 of the executing instruction is available when instruction execution is completed. If exception control unit 98 requires ROB status information 121 of the executing instruction, called instruction status 134, it is available with minimal delay.

Referring now to FIG. 7, a block diagram of a canceled tag portion of exception control unit 98 (FIG. 4) and a reorder buffer for use with multiple functional units is shown. FIG. 7 includes instruction storage 92, comparators 136A–136C, hit mask generators 140A–140C, priority mask circuit 144, cancel mask generator 148, multiplexers 152A–152C and multiplexer 156. The embodiment in FIG. 7 is configured to receive results of concurrently executed instructions from multiple functional units. In one embodiment, instruction storage 92 is a three-column line-oriented instruction storage, as discussed above. Comparators 136 receive execution tags 65 from functional units 24. Comparator 136A is connected to instruction storage 92 and execution tag 65A, which indicates the tag of the instruction being executed by functional unit 24A. Comparator 136A compares execution tag 65A to reorder buffer tags 123 for each instruction in instruction storage 92.

Comparator 136A generates a plurality of hit signals 138A. Hit signals 138A are substantially similar to hit signals 122 in FIG. 6. Comparator 136A compares reorder buffer tags 123 to execution tag 65A. Hit mask generator 140A receives hit signals 138A and generates hit mask 142A substantially similar to hit mask 126 described in reference to FIG. 6. In a similar manner, comparator 136B compares reorder buffer tags 123 from instruction storage 92 to execution tag 65B. Comparator 136B outputs hit signals 138B which are received by hit mask generator 140B. Hit mask generator 140B generates hit mask 142B. Likewise, comparator 136C creates hit signals 138C from execution tag 65C and reorder buffer tags 123, and hit mask generator 140C generates hit mask 142C.

Each hit mask 142 indicates which instructions within instruction storage 92 should be canceled if a branch misprediction is detected by the functional unit that corresponds to that hit mask 142. Because multiple functional unit results may be received each cycle, multiple branch mispredictions can be detected and result status signals 64 must be prioritized to determine the branch misprediction that occurs earliest in the program execution sequence.

Priority mask circuit 144 prioritizes branch mispredictions based on result status 64. Priority mask circuit 144 uses result status 64 to determine which functional units detected a branch misprediction, and which hit mask represents the earliest branch misprediction in the program execution sequence. In one embodiment, a plurality prioritization masks are generated using hit masks 142. In a microprocessor with three functional units, six prioritization masks are generated. Each mask represents whether the instruction being executed by a functional unit is earlier or later in the program execution sequence than the instructions being executed by other functional units. The six prioritization masks are generated using the equations below:

MASK_A_B=hit mask 142B [j−1]

MASK_A_C=hit mask 142C [j−1]

MASK_B_A=hit mask 142A [k]

MASK_B_C=hit mask 142C [k−1]

MASK_C_A=hit mask 142A [m]

MASK_C_B=hit mask 142B [m]

Where j, k, and m are line numbers of the instruction storage positions of the executing instructions of functional units 24A, 24B, and 24C, respectively. For example, MASK_A_B indicates whether the instruction being executed by functional unit 24A is later in the program execution sequence than the instruction being executed by functional unit 24B. Similarly, MASK_A_C indicates whether the instruction being executed by functional unit 24A is later in the program execution sequence than the instruction being executed by functional unit 24C.

In one embodiment, branch mispredict signals 146 are generated from the prioritization masks. Branch misprediction signals 146 indicates which instruction is the earliest branch misprediction. When result status 64 is received, branch misprediction signals 146 are generated based on result status 64 and the prioritization masks. The following logical equations may be used to generate branch misprediction signals 146:

Branch Misprediction 146A=MispredictionA & (~MASK_A_B|~MispredictionB) & (~MASK_A_C|~MispredictionC)

Branch Misprediction 146B=MispredictionB & (~MASK_B_A|~MispredictionA) & (~MASK_B_C|~MispredictionC)

Branch Misprediction 146C=MispredictionC &

(~MASK_C_A|~MispredictionA) &

(~MASK_C_B|~MispredictionB)

MispredictionA, MispredictionB, and MispredictionC are indicative of a mispredicted branch being indicated by Result Status 64A, Result Status 64B, and Result Status 64C, respectively.

Only one of the branch misprediction signals above is activated at one time. The activated branch misprediction signal indicates the earliest mispredicted branch instruction in the program execution sequence. If no mispredicted branch is detected all the mispredicted branch signals are deactivated.

Cancel mask 150 is generated by cancel mask circuit 148 based on hit masks 142 and branch misprediction signals 146. Generally speaking, cancel mask circuit 148 is a circuit configured to select a designated mask that corresponds to an instruction that results in an exception upon execution. Branch misprediction signals 146 identify the branch misprediction that occurs earliest in the program execution sequence. In one embodiment, cancel masks 150 are generated to cancel all instructions in instruction storage 92 that occur later in the program execution sequence than the mispredicted branch instruction. In one specific embodiment, cancel mask circuit 148 is a multiplexer that selects the hit mask 142 that corresponds to the mispredicted branch identified by branch misprediction signal 146.

As discussed above, exception control unit 98 requires status information stored in instruction storage 92 to properly handle an exception. In one embodiment, the reorder buffer is a line-oriented reorder buffer. In one specific embodiment, the reorder buffer is organized in three columns. Each column stores instructions allocated to one functional unit. In other words, instructions executed by functional unit 24A are stored in column A of instruction storage 92. Likewise, instructions executed by functional units 24B and 24C are stored in columns B and C of instruction storage 92, respectively. In one embodiment, ROB status information 121 of each column of instruction storage 92 is connected to a multiplexer 152. In other words, ROB status information from column A (121A) is connected to multiplexer 152A, ROB status information 121B is connected to multiplexer 152B, and ROB status information 121C is connected to multiplexer 152C. The control lines of multiplexers 152 are coupled to hit signals 138. Hit signals 138 identify the instruction currently being executed by each functional unit. Therefore, multiplexer 152A selects the ROB status information for the instruction being executed by functional unit 24A. Likewise, multiplexers 152B and 152C select the ROB status information of the instructions being executed by functional units 24B and 24C, respectively. For example, if instruction storage 92 stores forty-five instructions in three columns of fifteen instructions each, multiplexer 152A, 152B and 152C are each fifteen-to-one multiplexers. Each multiplexer selects ROB status information of the executing instructions from the fifteen instruction storage positions in a column of instruction storage 92. The ROB status information needed by exception control unit 98 is the ROB status information of the first mispredicted branch instruction. Because the output of multiplexers 152A, 152B and 152C are the status information of the three instructions being executed by the functional units, one of the outputs will be the desired status information. Multiplexer 156 selects one of the outputs of multiplexers 152 based on branch misprediction signals 146. Branch misprediction signals 146 identify in which column the earliest mispredicted branch instruction occurs. Therefore, multiplexer 156 selects the status information from the earliest mispredicted branch instruction from the outputs of multiplexers 152 based on branch misprediction signals 146. This selected status information is referred to as instruction status 134. Because the fifteen-to-one multiplexing of multiplexers 152 is accomplished in parallel with the execution of the instruction, the time delay to select instruction status 134 is greatly reduced. Rather than performing a forty-five-to-one selection after the result status is received, a three-to-one selection among the outputs of multiplexers 152 is sufficient.

In another embodiment, a non-line-oriented reorder buffer can be utilized. In this embodiment, the executing instruction of each functional unit can be allocated to any instruction storage position of instruction storage 92. Therefore, multiplexers 152 must each select from the entire instruction storage. If the reorder buffer is a forty-five entry reorder buffer, then multiplexers 152 must each be forty-five to one multiplexers.

Figure 8:
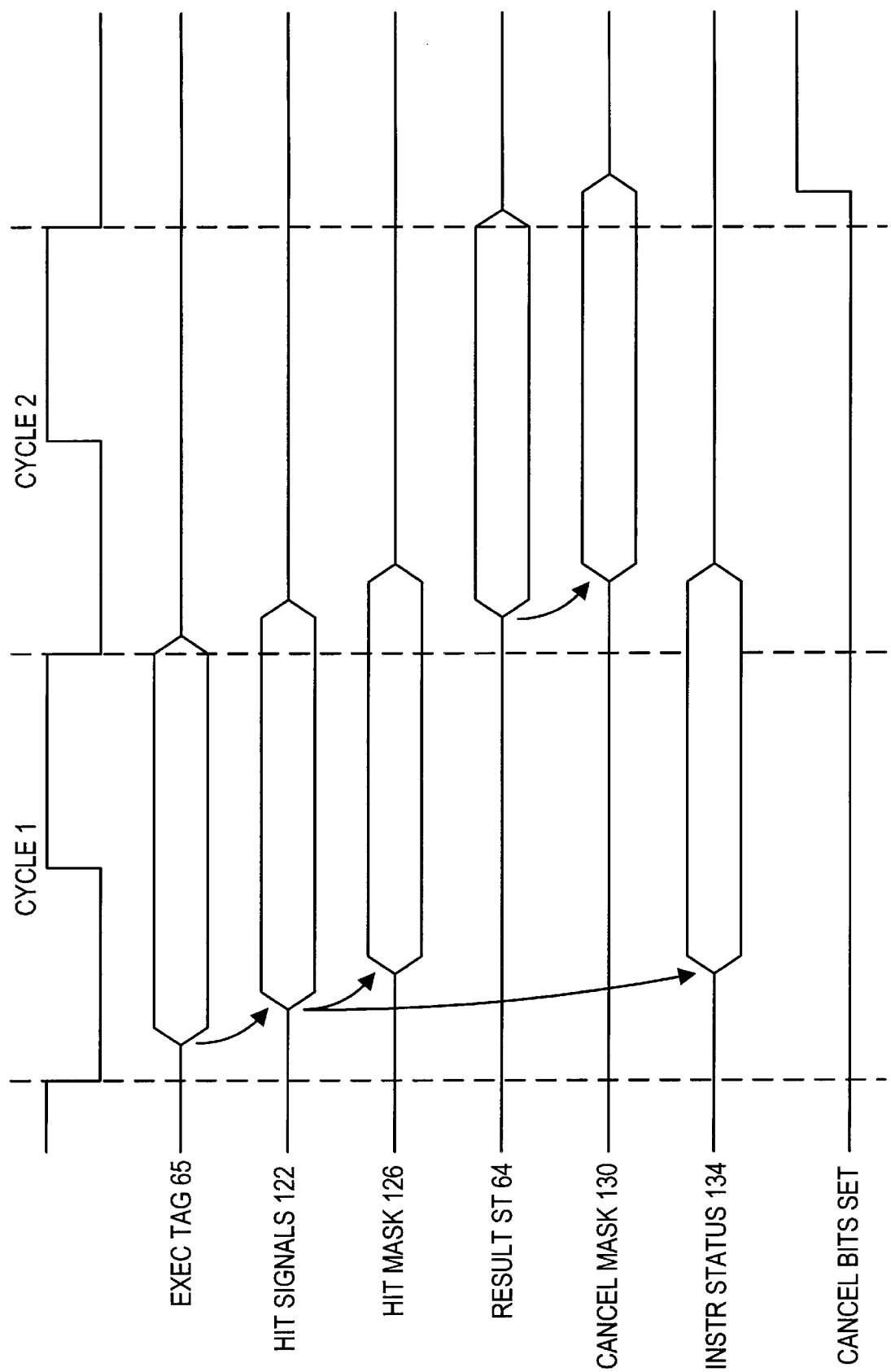
FIG. 8 is a timing diagram illustrating the timing relationship of the exception control unit and the instruction storage shown in FIG. 6.

Referring now to FIG. 8, a timing diagram illustrating the timing relationship of the electrical signals in FIG. 6 is shown for one embodiment. In cycle one, execution tag 65 is received from functional unit 24. As discussed above, execution tag 65 is available prior to the execution of the instruction. Hit signals 122 are valid after the propagation delay of comparator 120. Hit mask 126 is generated from hit signals 122 and valid after a propagation delay of hit mask circuit 124. Instruction status 134 is valid after the propagation delay of multiplexer 132. In cycle two, result status 64 is received from functional units 24. Cancel mask 130 is valid after the propagation delay of cancel mask circuit 128. In a cycle three, the canceled bits of the instructions identified by cancel mask 130 are activated.

Figure 9:
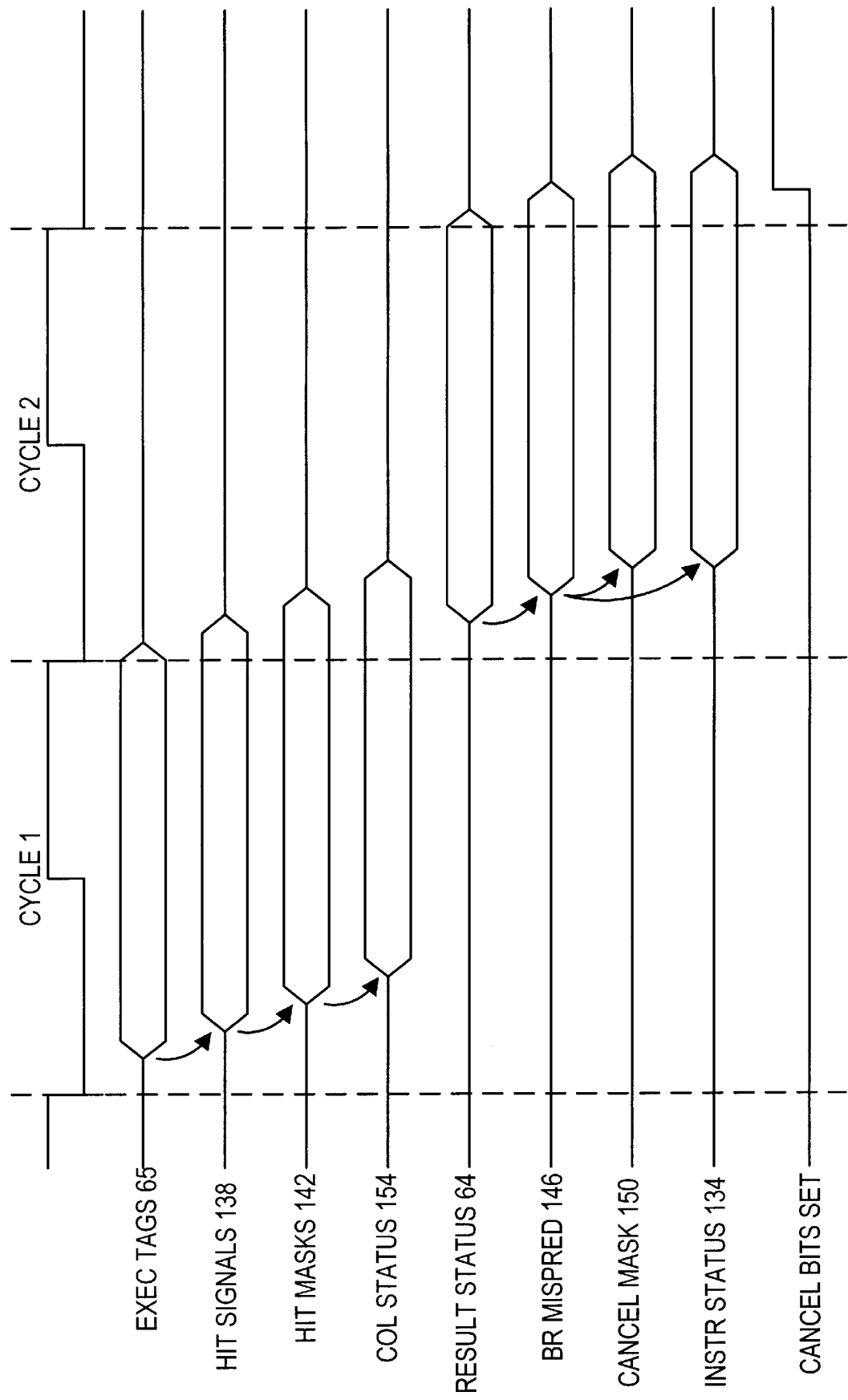
FIG. 9 is a timing diagram illustrating the timing relationship of the exception control unit and the line-oriented instruction storage shown in FIG. 7.

Referring now to FIG. 9, a timing diagram illustrating the timing relationships of the electrical signals in FIG. 7 is shown for one embodiment. In cycle one, execution tag 65 is received from functional units 24. Hit signals 138 are valid after the propagation delay of comparators 136. Hit masks 142 are valid after the propagation delay of hit mask generator 140. After hit signals 138 are valid, column status 154 is valid after the propagation delay of multiplexers 152. In cycle two, result status 64 is received from functional units 24. Branch misprediction signal 146 is valid after a propagation delay of priority mask circuit 144. Cancel mask 150 is valid after a propagation delay of cancel mask generator 148. After branch misprediction signal 146 is valid, instruction status 134 is valid after the propagation delay of multiplexer 156.

Turning now to FIG. 10, a list 130 of exemplary information stored in an instruction field 110–114 according to one specific implementation of reorder buffer 32 is shown. Additional, substitute, or alternative information may be stored by other embodiments. Information having a bit encoding suffixed thereto is multi-bit information. Otherwise, a single bit is used.

The instruction result is stored in the instruction field, and a result valid bit indicates whether or not the instruction result has been provided. Similarly, any flag bits which are updated are stored in the instruction field. The branch indication is set if the instruction is a branch. The LS_Sync bit is set if a load/store resync is needed. A load instruction may need resynchronization (i.e. refetch and reexecution of the instruction and subsequent instructions in program order) if the load instruction is performed out of order and a snoop hit is detected on the address accessed by the load instruction prior to retirement of the load instruction. Store instructions which update instruction code which is outstanding within microprocessor 10 are also detected, causing a setting of the LS_Sync bit. Instructions following the store instruction for which the bit is set are refetched and reexecuted. The SBZ bit indicates, when set, that a shift by zero is performed for the corresponding instruction. Shift by zero is a defined exception for x86 instructions. Exception and breakpoint information corresponding to the instruction is stored as well.

As mentioned above, last-in-line (LIL) and last-in-buffer (LIB) information is stored for each instruction. LIL and LIB information corresponds to the destination register, while FLIL and FLIB correspond to the flags register. Four LIB bits are used, one bit corresponding to each portion of the destination register which may be selected by an instruction. The LIB bit to be used in the dependency comparison may be selected according to the size of the source operand being compared. In this manner, an update to the AH register, for example, does not interfere with an access to the AL register. Four FLIB bits are used as well, except that the four FLIB bits correspond to four groups of flag bits. A first group includes the S, Z, P, and A bits; a second group is the 0 bit; a third group is the D bit; and a fourth group is the C bit. Similar to the FLIB bits, the FLIL bits correspond to each of four groups of flags. The groups are chosen based upon the manner in which the x86 instruction set updates the flags.

The LIL bits are used as enables for updating register file 30. Therefore, one LIL bit indicates that the most significant two bytes of the destination register are updated by the instruction corresponding to this instruction field; a second LIL bit indicates that byte 1 (e.g. AH) is updated by the instruction; and a third LIL bit indicates that byte 0 (e.g. AL) is updated by the instruction.

The cancel bit, when set, indicates that the instruction has been canceled. An instruction is canceled if it is subsequent to a mispredicted branch. An instruction having the cancel bit set does not update register file 30.

The destination specifier is stored for each instruction, as well as a destination valid bit. The destination specifier may be invalid, for example, when the destination operand of the instruction is a memory location. WRFL[3:0] is used to indicate which flag groups are updated by the instruction. Similar to the LIL bits, Size[2:0] encodes the size of the destination operand. End_byte[3:0] stores the least significant four bits of the address at which the last byte of the instruction is stored. End_byte[3:0] may be used in conjunction with a program counter field described below to calculate an address for the program count register upon retirement of the instruction. The CRET bit is set if the instruction is a CALL or RETURN instruction. PC_Sel indicates which of two program counter values stored in shared field 116 corresponds to the instruction. If PC_Sel is clear, the first program counter value is selected. Otherwise, the second program counter value is selected. Similarly, the Sel_eflg field indicates which of two flags registers should be updated by this instruction. MROM instructions have a flags register dedicated for their use in addition to the architecturally defined flags register.

The INT_ENB bit, when set, indicates that the instruction may cause an interrupt. Instructions dispatched from MROM unit 34 cannot cause an interrupt, while fast path instructions may. The store bit is set if the instruction performs a store memory operation. Similarly, the WSR bit is set if the instruction updates a special register. The Null bit is set if the instruction field is not storing a valid instruction.

The Null bit may be set for instruction fields which did not receive an instruction upon allocation of the line of storage (i.e. less than the maximum number of concurrently dispatchable instructions was dispatched). Alternatively, an entry may be nullified if an exception is detected. The exit bit is set if the instruction is the last instruction of an MROM instruction sequence of if the instruction is a fast path instruction. Finally, the entry valid bit indicates that the instruction field is storing valid information. The entry valid bit is set if the Null bit is clear and the Cancel bit is clear.

Figure 11:
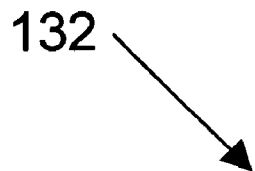
FIG. 11 is a table of information shared by the instructions within a line of storage according to one embodiment of the line-oriented reorder buffer shown in FIG. 4.

FIG. 11 is a list 132 of exemplary information stored in shared field 116 according to one specific line-oriented implementation of reorder buffer 32. Additional, substitute, or alternative information may be stored by other embodiments. Information having a bit encoding suffixed thereto is multi-bit information. Otherwise, a single bit is used.

The branch misprediction bit is set if a mispredicted branch is within the line of storage, or a mispredicted branch is within any line of storage that stores instructions later in the program execution sequence. Otherwise, the branch misprediction bit is clear. CSSEL stores the code segment selector for the line of instructions. The floating point bit is set if the line includes a floating point instruction, and the floating point instruction opcode is stored in FPOPC[10:0]. The FSYNC bit is set if a forced synchronization is performed for this line of storage. Forced synchronizations are performed upon execution of a taken branch instruction which was not detected by branch prediction unit 14. Branch prediction unit 14 is thereby updated with information identifying the taken branch instruction prior to retirement of the taken branch instruction.

The shared field stores up to two program count values per line. PC1 stores the program counter address for the first instruction stored within the line. PC2 stores the address of a split line instruction or the target of a branch instruction. In this manner, instructions for up to two different cache lines may be stored within a single line of storage. In one particular embodiment, instructions from three different cache lines may be stored when the first instruction in the line is a split line instruction and the second instruction is a predicted taken branch instruction. The Last1 bit, Linetag1[4:0], and LineOffset[3:0] correspond to PC1. Similarly, the Last2 bit, Linetag2[4:0], and LineOffset[3:0] correspond to PC2. The last bit is set if the last instruction in the cache line indicated by the corresponding PC value is within the line of storage. The line tag identifies branch prediction information corresponding to a branch instruction within the line. The branch prediction information may remain stored in branch prediction unit 14, and is updated by communicating the results of the branch instruction along with the line tag to branch prediction unit 14. Branch mispredictions are communicated upon detection of the mispredictions, while correct predictions are updated upon retirement of the corresponding branch instruction. The line offset contains a value which, when added to the corresponding PC value, locates the beginning of the next instruction after the instructions included within the line of storage.

The MROM bit is set if the line of storage contains one or more MROM instructions, and is clear otherwise. The NoMisp bit is set if the line cannot mispredict (i.e. no predicted branch instruction is in the line). The PCSHFT bit is set if the first instruction in the line of storage is a split line instruction (e.g. a portion of the instruction is in one instruction cache line the remainder is in another instruction cache line). If the first instruction is a split line instruction, PC1 corresponds to the cache line storing the remaining portion. PC2 may therefore be used for the target of a branch instruction. Finally, VLTAG[3:0] stores the reorder buffer tag assigned to the line of storage. VLTAGP1[3:0] stores the reorder buffer tag plus 1 (for use in resetting storage location 118 shown in FIG. 5 upon detection of a mispredicted branch instruction).

Figure 12:
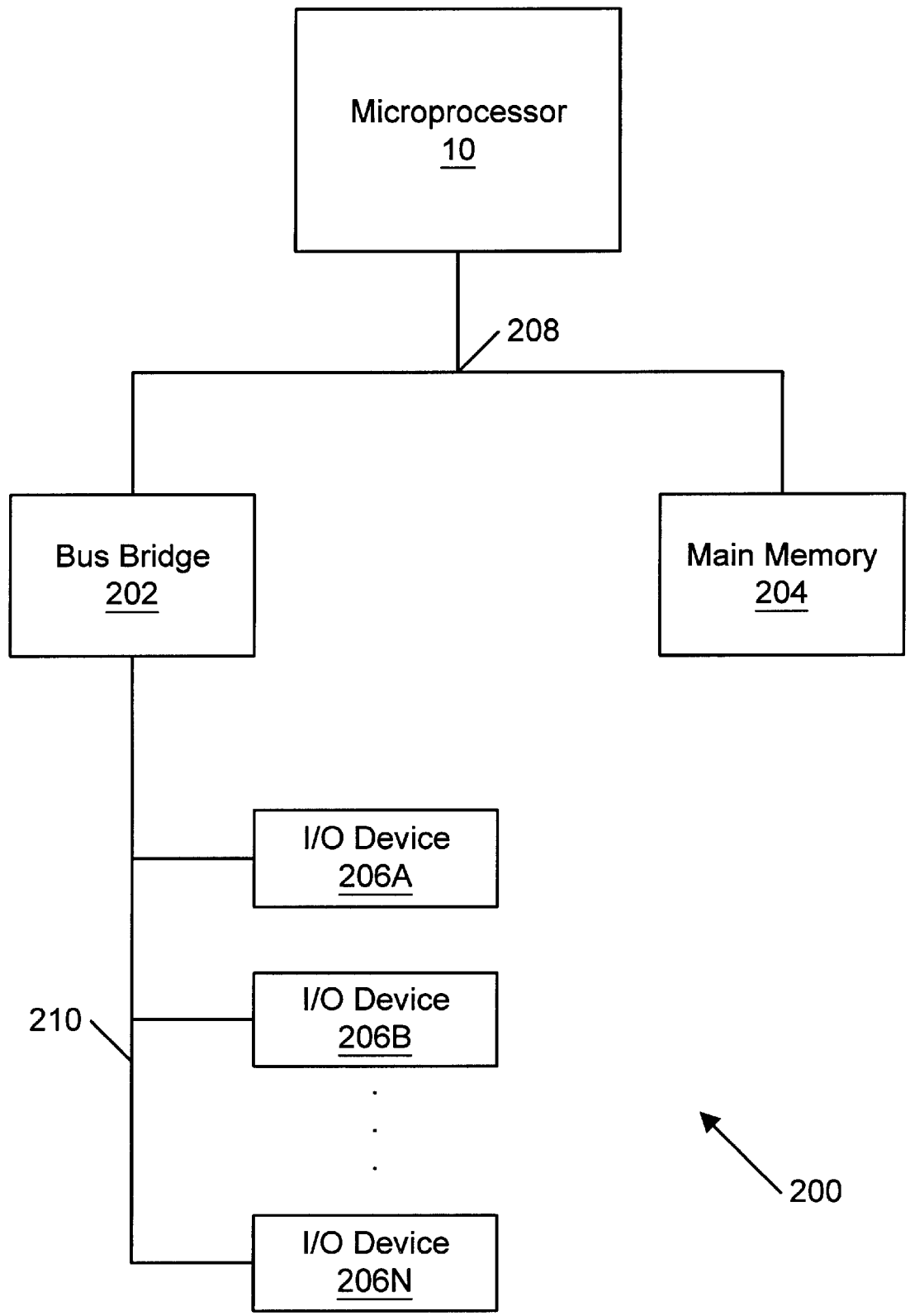
FIG. 12 is a block diagram of a computer system employing the microprocessor shown in FIG. 1.

Turning now to FIG. 12, a computer system 200 including microprocessor 10 is shown. Computer system 200 further includes a bus bridge 202, a main memory 204, and a plurality of input/output (I/O) devices 206A–206N. Plurality of I/O devices 206A–206N will be collectively referred to as I/O devices 206. Microprocessor 10, bus bridge 202, and main memory 204 are coupled to a system bus 208. I/O devices 206 are coupled to an I/O bus 210 for communication with bus bridge 202.

Bus bridge 202 is provided to assist in communications between I/O devices 206 and devices coupled to system bus 208. I/O devices 206 typically require longer bus clock cycles than microprocessor 10 and other devices coupled to system bus 208. Therefore, bus bridge 202 provides a buffer between system bus 208 and input/output bus 210. Additionally, bus bridge 202 translates transactions from one bus protocol to another. In one embodiment, input/output bus 210 is an Enhanced Industry Standard Architecture (EISA) bus and bus bridge 202 translates from the system bus protocol to the EISA bus protocol. In another embodiment, input/output bus 210 is a Peripheral Component Interconnect (PCI) bus and bus bridge 202 translates from the system bus protocol to the PCI bus protocol. It is noted that many variations of system bus protocols exist. Microprocessor 10 may employ any suitable system bus protocol.

I/O devices 206 provide an interface between computer system 200 and other devices external to the computer system. Exemplary I/O devices include a modem, a serial or parallel port, a sound card, etc. I/O devices 206 may also be referred to as peripheral devices. Main memory 204 stores data and instructions for use by microprocessor 10. In one embodiment, main memory 204 includes at least one Dynamic Random Access Memory (DRAM) and a DRAM memory controller.

It is noted that although computer system 200 as shown in FIG. 12 includes one bus bridge 202, other embodiments of computer system 200 may include multiple bus bridges 202 for translating to multiple dissimilar or similar I/O bus protocols. Still further, a cache memory for enhancing the performance of computer system 200 by storing instructions and data referenced by microprocessor 10 in a faster memory storage may be included. The cache memory may be inserted between microprocessor 10 and system bus 208, or may reside on system bus 208 in a "lookaside" configuration.

Although the x86 microprocessor architecture is used in certain illustrative embodiments above as a specific example, the present invention is not limited to this architecture. Conversely, the present invention may be useful in embodiments of microprocessor 10 employing any microprocessor architecture. It is further noted that, as opposed to a FIFO buffer as described above, instruction storages similar to instruction storage 92 may employ a plurality of storage locations which are not shifted. Instead, read and write pointers are used to indicate the next storage location to be allocated to a set of concurrently decoded instructions and to indicate the bottom of the reorder buffer, respectively.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded or canceled in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

It is noted that a superscalar microprocessor in accordance with the foregoing may further employ the latching structures as disclosed within the co-pending, commonly assigned patent application entitled "Conditional Latching Mechanism and Pipelined Microprocessor Employing the Same", Ser. No. 08/400,608 filed Mar. 8, 1995, by Pflum et al. The disclosure of this patent application is incorporated herein by reference in its entirety.

It is further noted that aspects regarding the reorder buffer may be found in the co-pending, commonly assigned patent application entitled "A Line-Oriented Reorder Buffer for a Superscalar Microprocessor", Ser. No. 08/690,085 filed Jul. 26, 1996 by Witt et al. The disclosure of this patent application is incorporated herein by reference in its entirety.

It is further noted that aspects regarding array circuitry may be found in the co-pending, commonly assigned patent application entitled "High Performance Ram Array Circuit Employing Self-Time Clock Generator for Enabling Array Access", Ser. No. 08/473,103 filed Jun. 7, 1995 by Tran. The disclosure of this patent application is incorporated herein by reference in its entirety.

It is additionally noted that other aspects regarding superscalar microprocessors may be found in the following co-pending, commonly assigned patent applications: "Linearly Addressable Microprocessor Cache", Ser. No. 08/146,381, filed Oct. 29, 1993 by Witt; "Superscalar Microprocessor Including a High Performance Instruction Alignment Unit", Ser. No. 08/377,843, filed Jan. 25, 1995 by Witt, et al; "A Way Prediction Structure", Ser. No. 08/522,181, filed Aug. 31, 1995 by Roberts, et al; "A Data Cache Capable of Performing Store Accesses in a Single Clock Cycle", Ser. No. 08/521,627, filed Aug. 31, 1995 by Witt, et al; "A Parallel and Scalable Instruction Scanning Unit", Ser. No. 08/475,400, filed Jun. 7, 1995 by Narayan; and "An Apparatus and Method for Aligning Variable-Byte Length Instructions to a Plurality of Issue Positions", Ser. No. 08/582,473, filed Jan. 2, 1996 by Tran, et al. The disclosure of these patent applications are incorporated herein by reference in their entirety.

Numerous variations and modifications will become apparent to those skilled in the art once the above disclosure is fully appreciated. It is intended that the following claims be interpreted to embrace all such variations and modifications.

What is claimed is:

1. A reorder buffer for storing results of speculatively executed instructions, comprising:

an instruction storage device including a plurality of instruction storage positions configured to store speculatively executed results of instructions;

an instruction tag line configured to convey an execution tag signal that identifies a corresponding instruction dispatched to an execution unit, wherein said execution tag signal is configured to be conveyed prior to said corresponding instruction being executed; and a mask generation circuit coupled to said instruction tag line, wherein said mask generation circuit is configured to receive said execution tag signal, wherein said mask generator circuit, prior to or in parallel with said instruction being executed, is configured to generate a mask that indicates which of said speculatively executed results of instructions within said instruction storage device are subsequent in program order to said corresponding instruction.

2. The reorder buffer of claim 1, further comprising a result status line configured to convey a result status signal that indicates whether said corresponding instruction results is an exception upon execution.

3. The reorder buffer of claim 2, wherein if said result status signal indicates a branch misprediction has occurred, all speculatively executed results of instructions identified by said mask are canceled.

4. The reorder buffer of claim 1, further comprising a comparator coupled to said instruction storage device, to said instruction tag line and to said mask generation circuit, wherein said comparator identifies an instruction storage position within said instruction storage device that stores said speculatively executed result of said corresponding instruction.

5. The reorder buffer of claim 4, wherein said instruction storage positions of said instruction storage device are further configured to store status information of instructions and said reorder buffer further comprises a multiplexer coupled to said instruction storage device and to an output of said comparator, wherein said multiplexer selects status information corresponding to said corresponding instructions.

6. The reorder buffer of claim 5, wherein said selection by said multiplexer is prior to said corresponding instruction being executed.

7. The reorder buffer of claim 1, wherein said mask includes a bit for each instruction storage position in said instruction storage device.

8. The reorder buffer of claim 7, wherein a bit of said mask is deactivated if an instruction corresponding to said bit is earlier in program order than said corresponding instruction, and said bit is activated if said instruction corresponding to said bit is later in program order than said corresponding instruction.

9. A method for restoring a program state of a reorder buffer comprising the steps of:

receiving an execution tag signal in a mask generation circuit from an instruction tag line, wherein said execution tag signal identifies a corresponding instruction dispatched for execution prior to said corresponding instruction being executed;

generating a plurality of masks in said mask generation circuit, wherein said masks identify which of a plurality of speculatively executed results of instructions within said reorder buffer are subsequent in program order to said corresponding instruction and said masks are generated prior to or in parallel with said corresponding instruction being executed; and receiving a result status signal, wherein said result status signal indicates whether said corresponding instruction results is an exception upon execution.

10. The method for restoring a program state of a reorder buffer of claim 9 further comprising the step of selecting status information corresponding to said corresponding instruction prior to said corresponding instruction being executed.

11. The method for restoring a program state of a reorder buffer of claim 9 further comprising the step of comparing said execution tag signal to tags of instruction results stored in said reorder buffer.

12. The method for restoring a program state of a reorder buffer of claim 9 further comprising the step of canceling instructions identified by said mask if said result status signal indicates said corresponding instruction results in an exception.

13. A microprocessor comprising:

an instruction cache;

a decode unit coupled to said instruction cache;

a functional unit coupled to said decode unit;

a reorder buffer coupled to said functional unit and said decode unit, wherein said reorder buffer includes:
- an instruction storage device including a plurality of instruction storage positions configured to store speculatively executed results of instructions,
- an instruction tag line configured to convey an execution tag signal that identifies a corresponding instruction dispatched to an execution unit, wherein said execution tag signal is configured to be conveyed prior to said corresponding instruction being executed; and
- a mask generation circuit coupled to said instruction tag line, wherein said mask generation circuit is configured to receive said execution tag signal, wherein said mask generator circuit, prior to or in parallel with said instruction being executed, is configured to generate a mask that indicates which of said speculatively executed results of instructions within said instruction storage device are subsequent in program order to said corresponding instruction; and a register file coupled to said reorder buffer.

14. The microprocessor of claim 13, further comprising a result status line configured to convey a result status signal that indicates whether said corresponding instruction results is an exception upon execution.

15. The microprocessor of claim 14, wherein if said result status signal indicates a branch misprediction has occurred, all speculatively executed results of instructions identified by said mask are canceled.

16. The microprocessor of claim 13, further comprising a comparator coupled to said instruction storage device, to said instruction tag line and to said mask generation circuit, wherein said comparator identifies an instruction storage position within said instruction storage device that stores said speculatively executed result of said corresponding instruction.

17. The microprocessor of claim 16, wherein said instruction storage positions of said instruction storage device are further configured to store status information of instructions and said reorder buffer further comprises a multiplexer coupled to said instruction storage device and to an output of said comparator, wherein said multiplexer selects status information corresponding to said corresponding instructions.

18. The microprocessor of claim 17, wherein said selection by said multiplexer is prior to said corresponding instruction being executed.

19. The microprocessor of claim 13, wherein said mask includes a bit for each instruction storage position in said instruction storage device.

20. The microprocessor of claim 19, wherein a bit of said mask is deactivated if an instruction corresponding to said bit is earlier in program order than said corresponding instruction, and said bit is activated if said instruction corresponding to said bit is later in program order than said corresponding instruction.

* * * * *